US008438205B2

(12) United States Patent
Yonemura et al.

(10) Patent No.: US 8,438,205 B2
(45) Date of Patent: May 7, 2013

(54) EXPONENTIATION CALCULATION APPARATUS AND METHOD FOR CALCULATING SQUARE ROOT IN FINITE EXTENSION FIELD

(75) Inventors: Tomoko Yonemura, Kanagawa (JP); Hirofumi Muratani, Kanagawa (JP); Atsushi Shimbo, Tokyo (JP); Kenji Ohkuma, Kanagawa (JP); Taichi Isogai, Tokyo (JP); Yuichi Komano, Kanagawa (JP); Kenichiro Furuta, Tokyo (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1006 days.

(21) Appl. No.: 12/393,558

(22) Filed: Feb. 26, 2009

(65) Prior Publication Data
US 2010/0063986 A1   Mar. 11, 2010

(30) Foreign Application Priority Data
Sep. 10, 2008 (JP) ................................. 2008-232668

(51) Int. Cl.
*G06F 17/10* (2006.01)
*G06F 7/38* (2006.01)
*G06F 7/52* (2006.01)
*G06F 7/50* (2006.01)
*H04L 9/28* (2006.01)

(52) U.S. Cl.
USPC ........... 708/492; 708/491; 708/493; 708/708; 708/606; 708/620

(58) Field of Classification Search .......... 708/491–493, 708/606, 620
See application file for complete search history.

(56) References Cited

U.S. PATENT DOCUMENTS

| 3,816,722 A * | 6/1974 | Sakoe et al. ................ 708/424 |
| 2003/0097567 A1* | 5/2003 | Terao et al. .................. 713/176 |
| 2009/0083351 A1* | 3/2009 | Yonemura ..................... 708/277 |

FOREIGN PATENT DOCUMENTS
JP      2007-187978      7/2007

OTHER PUBLICATIONS

U.S. Appl. no. 13/225,964, filed Sep. 6, 2011, Hanatani, et al.
Karl Rubin, et al., "Torus-Based Cryptography", CRYPTO 2003, LNCS 2729, 2003, 17 pages.
Martijn Stam, et al., "Efficient Subgroup Exponentiation in Quadratic and Sixth Degree Extensions", CHES 2002, LNCS 2523, 2003, 16 pages.
Dan Boneh, et al., "Short signatures from Weil pairing", Asiacrypt 2001, LNCS 2248, 2001, 19 pages.
Masaaki Shirase, et al., "Some Efficient Algorithms for the Final Exponentiation of η𝑇Pairing", IACR ePrint Archive 2006/431, http://eprint.iacr.org, 15 pages.

(Continued)

*Primary Examiner* — Tammara Peyton
(74) *Attorney, Agent, or Firm* — Oblon, Spivak, McClelland, Maier & Neustadt, L.L.P.

(57) ABSTRACT

In a computing device that calculates a square of an element in a finite field, a vector representation of the element in the finite field is accepted. The vector representation includes a plurality of elements. The computing device performs a multiplication operation on a base field using the accepted elements, and obtains a multiplication value. The multiplication operation is determined by a condition under which the element in the finite field is placed in an algebraic torus. The computing device performs an addition and subtraction operation using the obtained multiplication value and the accepted elements, and obtains a calculation result of the square of the element. The addition and subtraction operation is determined by the condition. The computing device then outputs the calculation result.

22 Claims, 18 Drawing Sheets

OTHER PUBLICATIONS

Office Action mailed Mar. 5, 2013, in Japanese Patent Application No. 2008-232668, filed Sep. 10, 2008 (with English-language translation).

Yonemura et al., "Cryptosystems on Algebraic Tori: A Study of Arithmetic and (De)Compression Costs on Tori," The 2007 Symposium on Cryptography and Information Security, Jan. 2007, 7 pages.

Yonemura et al., "Cryptosystems on Algebraic Tori: Some Efficient Algorithms for Squaring," Technical Report of Institute of Electronics, Information and Communication Engineers, vol. 108, No. 355, Dec. 10, 2008, pp. 45-52.

Granger et al., "A Comparison of CEILIDH and XTR," Proceedings of 6$^{th}$ International Symposium of Algorithmic Number Theory (ANTS-VI), Jun. 2004, pp. 235-249.

* cited by examiner

FIG.1
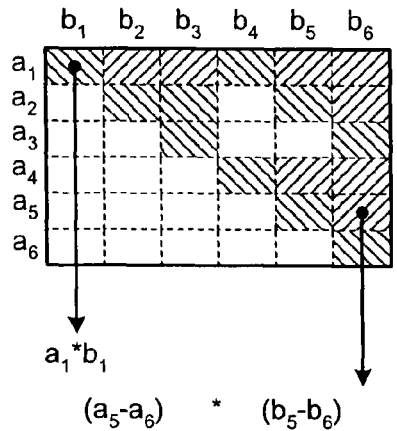
$a_1 * b_1$
$(a_5 - a_6) * (b_5 - b_6)$
FIG.2
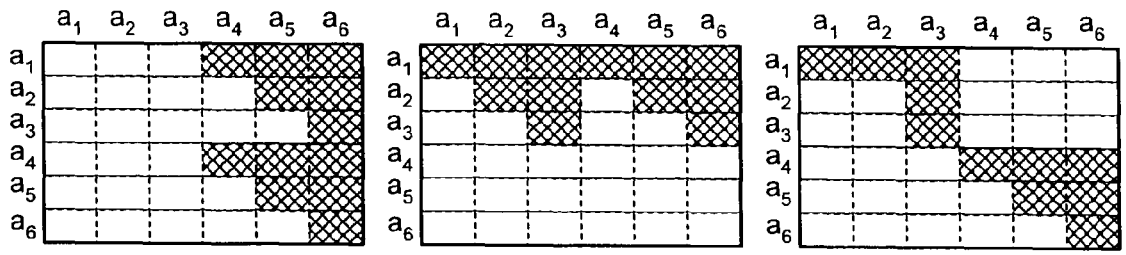
FIG.3
$$\left( \begin{array}{ccc} & b_1 & b_2 & b_3 \\ a_1 & 1 & & \\ a_2 & & 2 & -1 \\ a_3 & & -1 & -2 \end{array} , \begin{array}{ccc} & b_1 & b_2 & b_3 \\ a_1 & & 1 & \\ a_2 & 1 & & 1 \\ a_3 & & 1 & -1 \end{array} , \begin{array}{ccc} & b_1 & b_2 & b_3 \\ a_1 & & & 1 \\ a_2 & & 1 & \\ a_3 & 1 & & -1 \end{array} \right)$$
FIG.4
$$\left( \begin{array}{cc} & a_1 & a_2 \\ a_1 & 1 & \\ a_2 & & -1 \end{array} , \begin{array}{cc} & a_1 & a_2 \\ a_1 & & 2 \\ a_2 & & -1 \end{array} \right)$$

SQUARE COMPUTATION RULE

| r-TH DEGREE MODULUS OR ELEMENT ADDED DURING r-TH DEGREE EXTENSION | BASE OF r-TH DEGREE EXTENSION | QUADRATIC MODULUS OR ELEMENT ADDED DURING QUADRATIC EXTENSION | BASE OF QUADRATIC EXTENSION | SECOND-ORDER COMPONENT ($2^*r \times 2^*r \times 2^*r$ MATRIX) | FIRST-ORDER COMPONENT (VECTOR HOLDING $2^*r$ ELEMENTS) |
|---|---|---|---|---|---|
| $y = \zeta + \zeta^{-1}$ ($\zeta$ DENOTES PRIMITIVE NINTH ROOT OF 1) | $\{1, y, y^{\wedge}2-2\}$ | $f(x) = x^{\wedge}2 + x + 1$ | $\{1, x\}$ | Square8[k][i][j] | $(-2a_1 + 2a_4, -a_2 + a_5, a_3 - a_6, -4a_1 + 4a_4 - 2, 2a_2 - 2a_5, 2a_3 - 2a_6)$ |
| | | | | ① | ② |

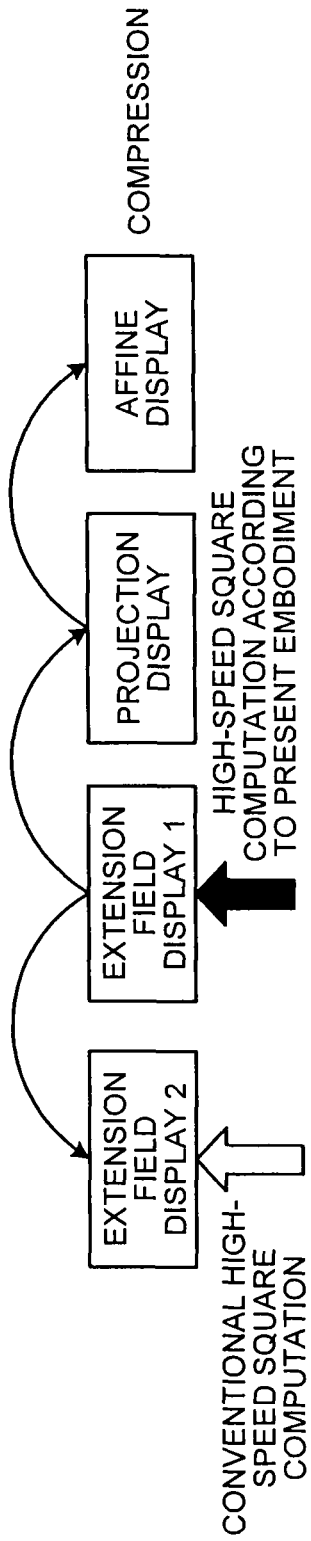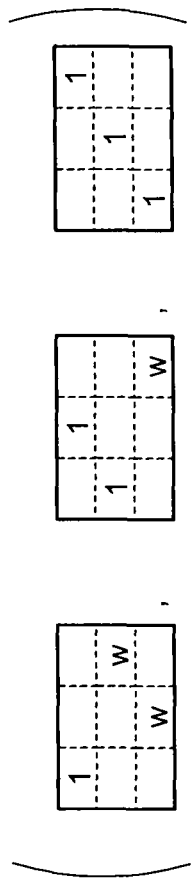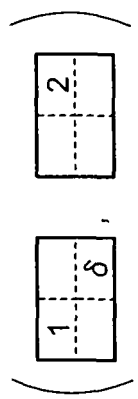

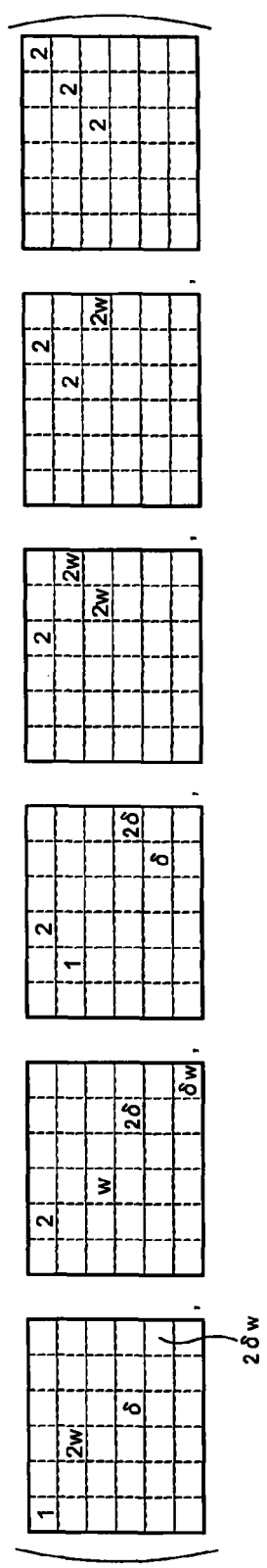

FIG.28

$$\left( \boxed{2\ \vert\ } , \boxed{\ \vert\ 2} \right) + (-1, 0)$$

FIG.29

FIRST TERM:

| 1 |   |   |   |   |
|---|---|---|---|---|
|   | -w |   |   |   |
|   |   | δ |   |   |
|   |   |   |   | -δw |
|   |   |   |   |   |

−a1=0

SECOND TERM:

|   | -1 |   |   |   |
|---|---|---|---|---|
|   |   | w |   |   |
|   |   |   | -δ |   |
|   |   |   |   | δw |

−a2=0

THIRD TERM:

|   |   | 1 |   |   |
|---|---|---|---|---|
|   | -1 |   |   |   |
|   |   |   |   | δ |
|   |   |   | -δ |   |

FOURTH TERM: [grid with 2, -w, -w]  $-a_4 * \delta^{(p^m-1)/2} = 0$

FIFTH TERM: [grid with -1, -1, 2w]  $-a_5 * \delta^{(p^m-1)/2} = 0$

SIXTH TERM: [grid with 1, -2, 1]  $-a_6 * \delta^{(p^m-1)/2} = 0$

FIG.35A

SQUARE COMPUTATION RULE

| r-TH DEGREE MODULUS OR ELEMENT ADDED DURING r-TH DEGREE EXTENSION | BASE OF r-TH DEGREE EXTENSION | QUADRATIC MODULUS OR ELEMENT ADDED DURING QUADRATIC EXTENSION | BASE OF QUADRATIC EXTENSION | SECOND-ORDER COMPONENT ($2*r \times 2*r$ MATRIX) | FIRST-ORDER COMPONENT (VECTOR HOLDING $2*r$ ELEMENTS) |
|---|---|---|---|---|---|
| $f_3(y)=y^{\wedge}3-w$ | $\{1, y, y^{\wedge}2-2\}$ | $f_2(x)=x^{\wedge}2-\delta$ | $\{1, x\}$ | Square15[k][i][j] → ① | $\left( 1, 0, 0, -2a_4\delta^{(p^m-1)}/2, -2a_5\delta^{(p^m-1)}/2, -2a_6\delta^{(p^m-1)}/2 \right)$ → ② |

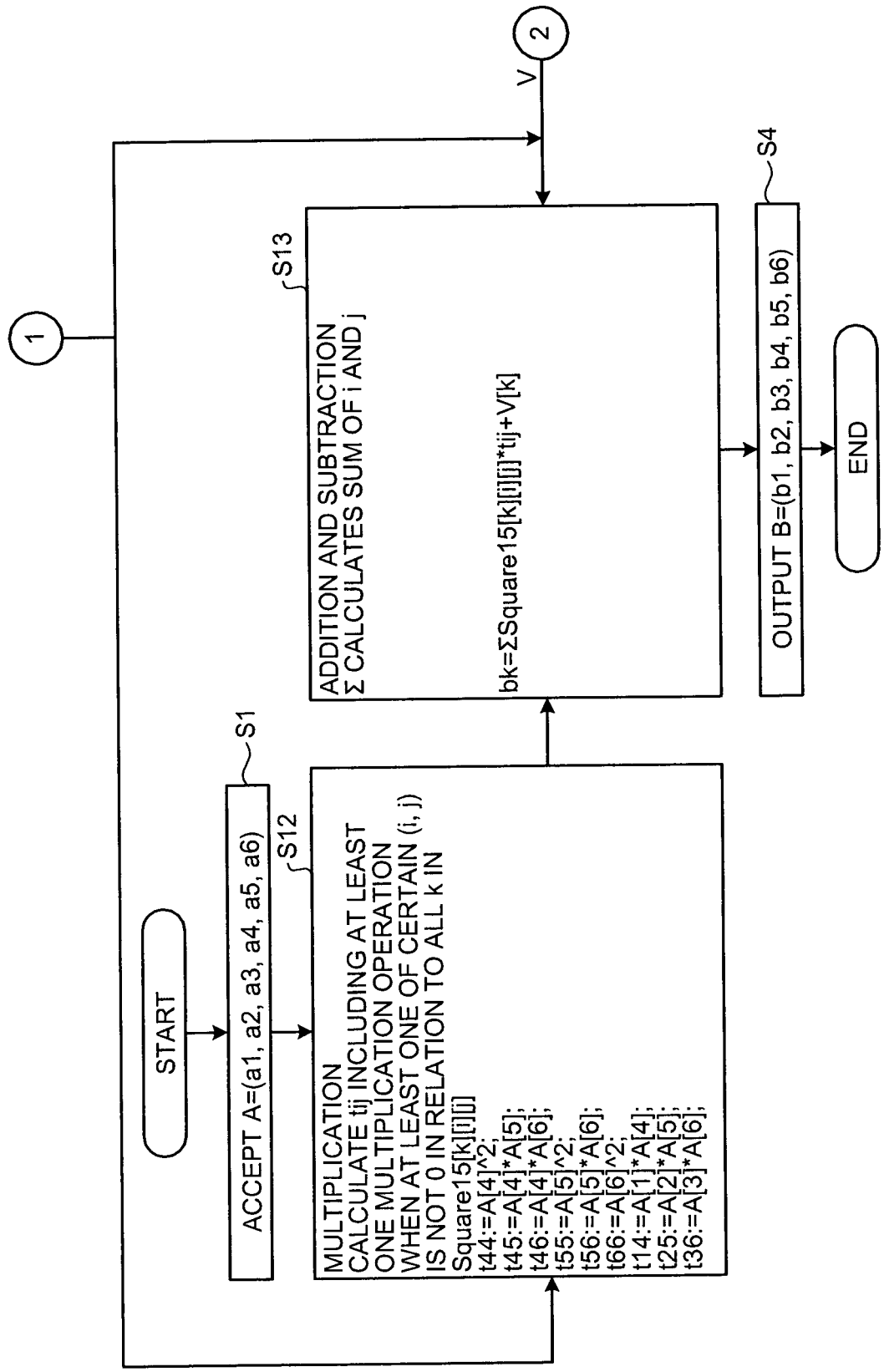

FIG.36A $$A^{q^r+1} = 1 \quad \cdots (1)$$

$$y = \varsigma + \varsigma^{-1} \quad \cdots (2)$$

$$A^{q^3+1} = 1 \quad \cdots (3)$$

$$A^{q^2-q+1} = 1 \quad \cdots (4)$$

$$A^{q^2} = (a_1, -a_2 + a_3, -a_2, a_4, -a_5 + a_6, -a_5) = B \quad \cdots (5)$$

$$A*B = A^{q^2+1} \quad \cdots (6)$$

$$A^{q^2+1} = A^q \quad \cdots (7)$$

$$A^q = (a_1 - a_4, -a_3 + a_6, a_2 - a_3 - a_5 + a_6, -a_4, a_6, -a_5 + a_6) = B \quad \cdots (8)$$

$$A^{q^r+1} - 1 = 0 \quad \cdots (9)$$

$$A^{q^r+1} \quad \cdots (10)$$

FIG.36B $$A^{q^2+1} - A^q = 0 \quad \cdots (11)$$

$$A^{q^2-1} \quad \cdots (12)$$

$$-A^q = (-a_1 + a_4, a_3 - a_6, -a_2 + a_3 + a_5 - a_6, a_4, -a_6, a_5 - a_6) \quad \cdots (13)$$

$$(4a_4 + 1, -2a_5 - 2a_6, 2a_4, -a_5, -a_6) \quad \cdots (14)$$

$$(-2a_1 + 2a_4, -a_2 + a_5, a_3 - a_6, -4a_1 + 4a_4 - 2, 2a_2 - 2a_5, 2a_3 - 2a_6) \quad \cdots (15)$$

$$(4a_1, 2a_2, 2a_3, -2a_1 - 1, a_2, a_3) \quad \cdots (16)$$

$$A^q = \left(a_1, a_2 w', -a_3(1+w'), a_4 \delta^{(p^m-1)/2}, a_5 \delta^{(p^m-1)/2} w', -a_6 \delta^{(p^m-1)/2}(1+w')\right)$$
HOWEVER, $q = p\wedge m$, $w' = w^{(p^m-1)/3}$, $w'^2 + w' + 1 = 0 \quad \cdots (17)$ $$\delta' = \delta^{(p^{2m}-1)/2} = 1 \quad \cdots (18)$$

$$V = \left(1, 0, 0, -2a_4 \delta^{(p^m-1)/2}, -2a_5 \delta^{(p^m-1)/2}, -2a_6 \delta^{(p^m-1)/2}\right) \quad \cdots (19)$$

US 8,438,205 B2

EXPONENTIATION CALCULATION APPARATUS AND METHOD FOR CALCULATING SQUARE ROOT IN FINITE EXTENSION FIELD

CROSS-REFERENCE TO RELATED APPLICATIONS

This application is based upon and claims the benefit of priority from the prior Japanese Patent Application No. 2008-232668, filed on Sep. 10, 2008; the entire contents of which are incorporated herein by reference.

BACKGROUND OF THE INVENTION

1. Field of the Invention

The present invention relates to a computing device, a method, and a computer program product for performing a square computation and a (q^l+q^l') multiplication in a finite field.

2. Description of the Related Art

Methods are known that use cryptography to protect information sent over a communication path. Some methods using cryptography require a key to be shared with a communication partner in advance. In a method such as this, it is troublesome to share and manage the key. On the other hand, a method using public key cryptography can realize secure communication without requiring a key to be shared in advance. Therefore, the method using public key cryptography is widely used as a basic technology for network security. Information terminals are becoming more diverse. Various schemes and protocols using a public key are being used in small devices through innovations in methods and packaging. For example, a method is proposed for compressing public key size and encrypted data size in public key cryptography (refer to K. Rubin and A Silverberg, "Torus-Based Cryptography", CRYPTO 2003, LNCS 2729, 349-365, 2003). A basis of the method is that, when a subset, referred to as an algebraic torus, in a set of numbers used in public key cryptography is used, an element of the set can be represented by a small number of bits.

A method is also proposed in which a square computation of an algebraic torus is performed at a high speed (refer to M. Stam and A. K. Lenstra, "Efficient Subgroup Exponentiation in Quadratic and Sixth Degree Extensions" CHES 2002, LNCS 2523, 318-332, 2002). In the method proposed in "Efficient Subgroup Exponentiation in Quadratic and Sixth Degree Extensions", in an algebraic torus that is a subgroup in a sixth degree extension field, a square in a pseudo-polynomial base is taken by a base field being multiplied nine times. Ordinarily, multiplication is calculated by 18 operations, and the square is calculated by 12 operations. Therefore, computation speed is increased in the method described in "Efficient Subgroup Exponentiation in Quadratic and Sixth Degree Extensions". When a root of a modulus f(x) is z, $\{1, z, z^2, z^3, z^4, z^5\}$ is referred to as a polynomial base, and $\{z, z^2, z^3, z^4, z^5, z^6\}$ is referred to as a pseudo-polynomial base. Here, the symbol '^' represents power, and 'z^a' indicates z to the a-th power.

Effective cryptographic protocols, such as a signature scheme, are configured using pairing (refer to D. Boneh, B. Lynn, and H. Shacham, "Short signatures from the Weil pairing" Asiacrypt 2001, LNCS 2248, 514-532, 2001). Pairing computation involves two steps: (1) an ambiguous pairing computation (such as Miller's algorithm), and (2) elimination of ambiguity (final exponentiation). For the final exponentiation, a method is proposed in which calculation when 'r=3' can be performed at a high speed (refer to M. Shirase, T. Takagi, and E. Okamoto, "Final Exponentiation for ηT Pairing", The Institute of Electronics, Information, and Communication Engineers Technical Report ISEC 2006-98). In the method proposed in "Final Exponentiation for ηT Pairing", in an algebraic torus that is a subgroup in a sixth degree extension field, a (q+1) multiplication is realized by a base field multiplied nine times. A base is a combination of a polynomial base of a quadratic extension and a polynomial base of a cubic extension. Thus, an example is known in which a speed of a square computation and a (q+1) multiplication is increased using a characteristic in which an element is the element of an algebraic torus T6(Fq). To use the method described in "Efficient Subgroup Exponentiation in Quadratic and Sixth Degree Extensions" in torus compression public key cryptography, a base (polynomial base of the quadratic extension and polynomial base of the cubic extension) ordinarily used for compression and expansion is required to be converted to a pseudo-polynomial base. As a result of a conversion such as this, an overhead occurs. Therefore, in torus compression public key cryptography such as this, the square computation is preferably performed at a high speed on a finite field. Similarly, in pairing, the square computation and (q^l+q^l') multiplication are preferably performed at a high speed on a finite field.

SUMMARY OF THE INVENTION

According to one aspect of the present invention, a computing device that calculates a square of an element in a finite field includes an accept unit accept a plurality of elements in the finite field, the elements being the vector representation, the vector representation including a plurality of elements, a multiplying unit that performs a multiplication operation in a base field using the accepted elements and obtains a multiplication value, the multiplication operation being determined by a condition under which the element in the finite field is placed in an algebraic torus, an adding and subtracting unit that performs an addition and subtraction operation using the obtained multiplication value and the accepted elements, and obtaining a calculation result of the square of the element, the addition and subtraction operation being determined by the condition, and an output unit that outputs the obtained calculation result.

According to another aspect of the present invention, a computing device calculates an exponent (q^l+q^l') (q denotes an order of a base field Fq) of an element in a 2r-th degree extension field, and the computing device includes an accept unit accept 2r elements in the 2r-th degree extension field, the elements being the vector representation, a multiplying unit that performs a multiplication operation in the base field Fq using the accepted elements and obtains a multiplication value, the multiplication operation being performed in adherence to a calculation rule determined by a condition using a characteristic in which the element in the 2r-th degree extension field is an element of an algebraic torus T2r, an adding and subtracting unit that performs an addition and subtraction operation using the obtained multiplication value and the accepted elements, and obtaining a calculation result of the exponent (q^l+q^l') of the element, the addition and subtraction operation being performed in adherence to the calculation rule, and an output unit that outputs the obtained calculation result.

According to still another aspect of the present invention, a method of computing a square is executed by a computing device that includes an accept unit, a multiplying unit, an adding and subtracting unit, and an output unit, and calculates a square of an element in a finite field. The method includes accepting by the accept unit, a plurality of elements in the finite field, the elements being the vector representation, obtaining a multiplication value by the multiplying unit, by performing a multiplication operation on a base field using the accepted elements, the multiplication operation being determined by a condition under which the element in the finite field is placed in an algebraic torus, obtaining a calculation result of the square of the elements by the adding and subtracting unit, by performing an addition and subtraction operation using the obtained multiplication value and the accepted elements, the addition and subtraction operation being determined by the condition, and outputting the obtained calculation result by the output unit.

According to still another aspect of the present invention, a computer program product has a computer-readable medium including programmed instructions, and when executed by a computer provided in a computing device that includes an accept unit, a multiplying unit, an adding and subtracting unit, and an output unit, and calculates a square of an element in a finite field, the instructions cause the computer to perform accepting a plurality of elements in the finite field, the elements being the vector representation, obtaining a multiplication value by performing a multiplication operation on a base field using the accepted elements, the multiplication operation being determined by a condition under which the element in the finite field is placed in an algebraic torus, obtaining a calculation result of a square of the element by performing an addition and subtraction operation using the obtained multiplication value and the accepted elements, the addition and subtraction operation being determined by the condition, and outputting the obtained calculation result.

BRIEF DESCRIPTION OF THE DRAWINGS

FIG. 1 is a diagram of a multiplication operation in a base field calculated when 'r=3', according to a first embodiment;

FIG. 2 is a diagram of a multiplication operation in the base field calculated on a square in an algebraic torus $T2(Fq^3)$;

FIG. 3 is a diagram of an example of a multiplication rule in a cubic extension field;

FIG. 4 is a diagram of an example of a square expressed in a quadratic extension field;

FIG. 5 is a diagram of an example of a square expressed in a sixth degree extension field;

FIG. 6 is a diagram of an example of a first conditional expression expressed in the quadratic extension field;

FIG. 7 is a diagram of an example of a first conditional expression expressed in the sixth degree extension field;

FIG. 8 is a diagram of an example of Expression 6 expressed in a cubic extension field;

FIG. 9 is a diagram of an example of Expression 7 expressed in the sixth degree extension field;

FIG. 10 is a diagram of an application example of the first conditional expression;

FIG. 11 is a diagram of an application example of the first conditional expression;

FIG. 12 is a diagram of an application example of the first conditional expression;

FIG. 13 is a diagram of an application example of a second conditional expression;

FIG. 14 is a diagram of a multiplication operation in the base field calculated on a square in an algebraic torus T6(Fq);

FIG. 15 is a diagram of an application example of the second conditional expression;

FIG. 16 is a diagram of a multiplication operation in the base field calculated on a square in an algebraic torus T6(Fq);

FIG. 17 is a diagram of an application example of the second conditional expression;

FIG. 18 is a diagram of a multiplication operation in the base field calculated on a square in an algebraic torus T6(Fq);

FIGS. 21A and 21B are a flowchart of a square computation process performed by the computing device 100;

FIG. 22 is a schematic diagram of a square computation method according to the first embodiment being applied to compression and decompression;

FIG. 23 is a diagram of an example of a multiplication rule in a cubic extension field according to a second embodiment;

FIG. 24 is a diagram of an example of a square computation rule of a quadratic extension field;

FIG. 25 is a diagram of an example of a square computation rule of a sixth degree extension field;

FIG. 26 is a diagram of an example of a first conditional expression expressed in the quadratic extension field;

FIG. 27 is a diagram of an application example of the first conditional expression;

FIG. 28 is a diagram of an application example of the first conditional expression;

FIG. 29 is a diagram of an example of first to third terms of a second conditional expression expressed in the sixth degree extension field;

FIG. 30 is a diagram of an example of fourth to sixth terms of the second conditional expression expressed in the sixth degree extension field;

FIGS. 35A and 35B are a flowchart of a square computation process performed by the computing device 100; and FIGS. 36A and 36B illustrate Expressions/terms 1 to 19.

DETAILED DESCRIPTION OF THE INVENTION

Figure 19:
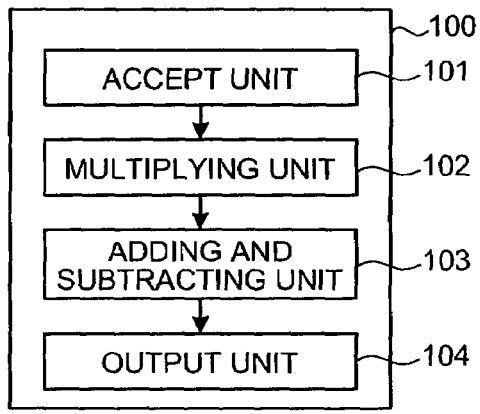
FIG. 19 is a diagram of an example of a functional configuration of a computing device 100.

First, a conventional computation method will be described. An instance in which an n-th degree extension field is expressed as a quadratic extension of an r-th degree extension field is given. Here, a modulus of the quadratic extension is '$f(x)=x^2+x+1$'. A base is a polynomial base $\{1, x\}$. In addition, 'A=(a1, a2)' represents 'A=a1+a2*x'. A product of 'A=(a1, 2)' and 'B=(b1, b2)' is 'A*B=(a1*b1−a2*b2, a1*b2+a2*b1−a2*b2)'. At this time, four types of multiplications, a1*b1, a2*b2, a1*b2, and a2*b1, in a base field related to the quadratic extension appear to be required. However, a1*b2 and a2*b1 always appear as 'a1*b2+a2*b1'. Therefore, three types of multiplications, a1*b1, a2*b2, and (a1−a2)*(b1−b2), in the base field are sufficient. This characteristic is not dependent on the modulus. The same characteristic is realized even when the modulus is '$f(x)=x^2+1$'. In the r-th degree extension field considered to be the base field in the quadratic extension as well, a nested structure can be further configured when r can be factorized into a prime number. Each field is considered in a similar manner. In this way, in the Karatsuba algorithm, multiplication operations required in the base field can be reduced through use of symmetry.

FIG. 1 is a diagram of a multiplication operation in the base field that is calculated when 'r=3'. A base of a cubic extension is {α1, α2, α3}. A base of a sixth degree extension field is {α1, α2, α3, α1*x, α2*x, α3*x}. When 'A=(a1, a2, a3, a4, a5, a6)' and 'B=(b1, b2, b3, b4, b5, b6)' are multiplied, ai*bi (i=1, . . . , 6) and ai*bj (i=1, 2, 3 and j=i+3) are calculated. In addition, (ai−aj)*(bi−bj) is calculated when 'j=i' (i=1, 2, 3 and j=1, 2, 3, or i=4, 5, 6 and j=4, 5, 6). When 'j≠i' (i=1, 2, 3 and j=4, 5, 6), when (i, j)=(1, 5), (a1−a2)*(b4−b5) is calculated. When (i, j)=(1, 6), (a1−a3)*(b4−b6) is calculated. When (i, j)=(2, 6), (a2−a3)*(b5−b6) is calculated. When 'j≠i', 'ai*bj+aj*bi' is merely required to be obtained. Therefore, a sum of ai and aj, and a sum of bi and bj can be taken. Subsequently, one of (ai±aj) and (bi±bj) can be multiplied by a minus. The computation method can be changed depending on a combination of i and j. FIG. 1 indicates that multiplication is performed 18 times when 'n=6'. When r is a prime number in 'n=2*r', the multiplication is performed '3r(r+1)/2' times.

Next, a conventional computation method for a square computation will be described. The conventional computation method is merely that when B equals A in A*B in the above-described multiplication. For example, 'A^2=(a1^2−a2^2, 2a1*a2−a2^2)' is calculated in the quadratic extension field. Here, A is an element of T2(Fq^r). A condition under which A is placed in the torus is expressed in Expression 1 shown in FIG. 36A, using a first characteristic.

First, 'A^{q^r}=a1+a2*x^{q^r}' is calculated. A modulus of the quadratic extension is 'f(x)=x^2+x+1'. When 'r=3' and 'q≡2 mod 9', 'x^{q^3}=−1−x. Using 'x^{q^3}=−1−x, 'A^{q^r+1}=(a1^2−a1*a2+a2^2)+0*x' can be calculated. Therefore, the condition in Expression 1 can be rewritten as 'a1^2−a1*a2+a2^2=1'. Under this condition, each product a1^2, a1*a2, and a2^2 is expressed by the two other products. For example, a1^2 is expressed by a1*a2 and a2^2. FIG. 2 is a diagram of a multiplication operation in the base field in which calculation is performed on a square in an algebraic torus T2(Fq^3). In FIG. 2, shaded portions indicate terms to be multiplied. In other words, FIG. 2 indicates that the multiplication is performed 12 times when 'n=6'. When r is a prime number in 'n=2*r', the multiplication is performed 'r(r+1)' times.

Next, a square computation according to a first embodiment of the present invention will be described. In the above-described conventional computation method for the square computation, only the first characteristic is used, in which A is the element of T2(Fq^r). According to the first embodiment, the number of times the multiplication is performed in the base field is further reduced through use of a second characteristic in which A is an element of T2r(Fq). Based on the second characteristic, when 'r=3', A is an element of T6(Fq). Here, when 'r=3' is described.

In other words, when the element of the algebraic torus T6(Fq) is exponentiated to an order thereof, namely raised to the power of (q^2−q+1), the element becomes '1'. When the element is exponentiated to an order thereof using a characteristic in which the element of T6(Fq) is also the element of T2(Fq^3), namely raised to a power of (q^3+1), the element becomes '1'. Therefore, according to the first embodiment, the characteristic in which A is the element of the algebraic torus T6(Fq) is separated into the first characteristic (the element becomes '1' when raised to the power of (q^3+1)) and the second characteristic (the element becomes '1' when raised to the power of (q^2−q+1)). The number of times the multiplication in the base field is performed in the square computation can be reduced through combination of the two characteristics.

When 'r=3', a base of the cubic extension is {1, y, y^2−2}. An element to be added is Expression 2 shown in FIG. 36A, where ζ is a primitive ninth root of '1'.

When 'q≡2 mod 9', in a multiplication in the cubic extension field, 'A*B=(a1*b1+2a2*b2+2a3*b3−a2*b3−a3*b3, a1*b2+a2*b1+a2*b3+a3*b2−a3*b3, a1*b3+a3*b1+a2*b2−a3*b3)' is calculated. FIG. 3 is a diagram of an example of a multiplication rule in the cubic extension field. The multiplication rule changes when the modulus and the base change. However, only each numeric value set in FIG. 3 changes. A similar calculation can be performed if the numeric value set is held. Hereafter, a calculation in a sixth degree extension field is only indicated in the drawings.

Figures 5, 6, 7:
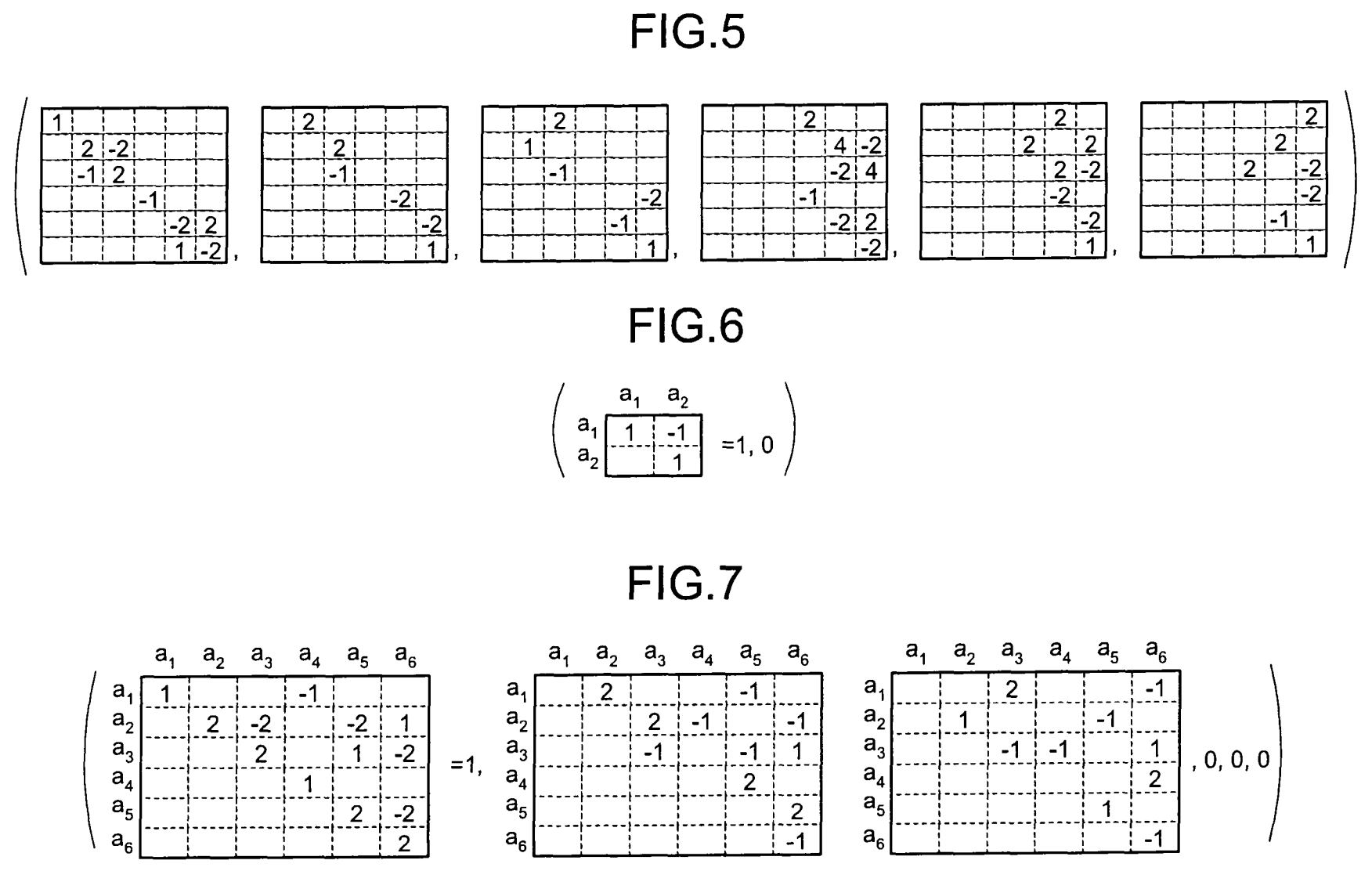

First, the square is written as a specific calculation formula. When expressed in the quadratic extension field, the calculation formula is 'A^2=(a1^2−a2^2, 2a1*a2−a2^2)'. An example of a diagram of the calculation formula is shown in FIG. 4. When A^2 is expressed in the sixth degree extension field through application of the multiplication rule of the cubic extension field, an example of the diagram of the calculation formula is as shown in FIG. 5.

Next, the first characteristic expressed by Expression 1 is written as a specific conditional expression (referred to as a first conditional expression) in the sixth extension field. Here, because 'r=3', the first conditional expression is expressed by Expression 3 shown in FIG. 36A.

When expressed in the quadratic extension field, the first conditional expression is 'a1^2−a1*a2+a2^2=1'. An example of a diagram of the first conditional expression is shown in FIG. 6. When the first conditional expression is expressed in the sixth extension field through application of the multiplication rule of the cubic extension field, an example of the diagram of the first conditional expression is as shown in FIG. 7.

Next, the second characteristic is written as a specific conditional expression (referred to as a second conditional expression) in the sixth extension field. Here, because 'r=3', the second conditional expression is expressed by Expression 4 shown in FIG. 36A.

Here, in the base being considered, a Frobenius map (q-th power) is a replacement of an element of the sixth degree extension field. Therefore, Expression 5 shown in FIG. 36A is obtained.

A product of A*B is expressed by Expression 6 shown in FIG. 36A when expressed in the cubic extension field.

Figures 8, 9, 10, 11, 12:
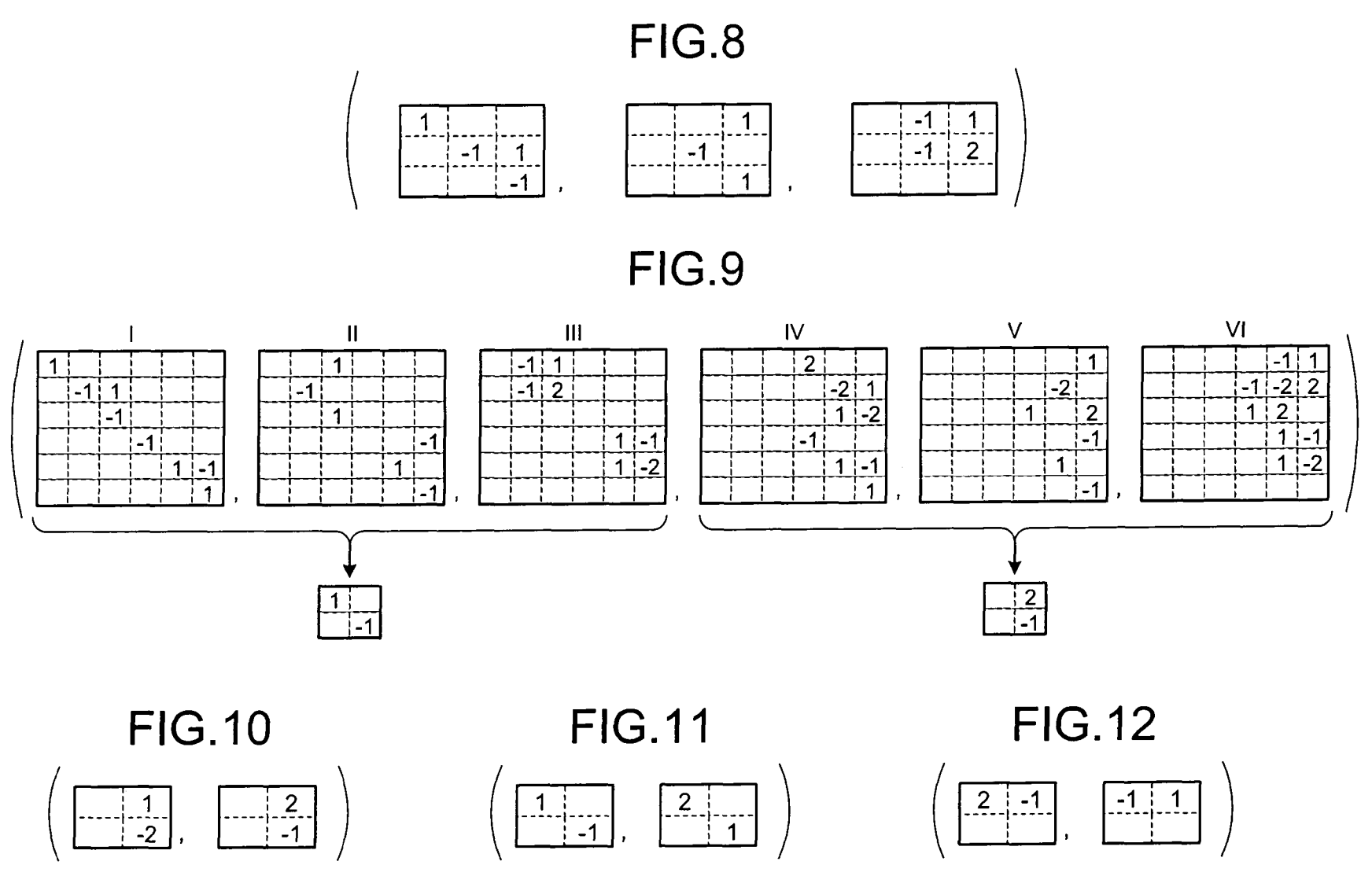

FIG. 8 is a diagram of Expression 6. In FIG. 8, Expression 6 is expressed in the cubic extension field. Here, Expression 7 shown in FIG. 36A is obtained.

FIG. 9 is a diagram of a left-hand side of Expression 7. In FIG. 9, Expression 7 is expressed in the sixth degree extension field. Here, to simplify explanation, the left-hand side of Expression 7 shown in FIG. 9 is (I, II, III, IV, V, VI). A right-hand side is expressed by Expression 8 shown in FIG. 36A. Roman numerals I, II, III, IV, V, VI are replacement symbols used for convenience and do not express the same values as the original numeric values.

Subsequently, the number of times multiplication is performed in the base field in the square is reduced. First, as in the conventional computation method, the number of times multiplication is performed in the base field is reduced through use of the first conditional expression using the first characteristic.

For example, subtraction is performed in which the first conditional expression shown in FIG. 6 is subtracted from a first term in the square shown in FIG. 4. FIG. 10 is a diagram of an expression of a subtraction result in this instance. In another example, addition is performed in which the first conditional expression shown in FIG. 6 is added twice to a second term in the square. FIG. 11 is a diagram of an expression of an addition result in this instance. In still another example, addition is performed in which the first conditional expression is added to the first term in the square, and the first conditional expression is also added to the second term in the square. FIG. 12 is a diagram of an expression of an addition result in this instance. Which of the three addition and subtraction operations is performed is determined arbitrarily or by a predetermined method.

Figures 13, 14, 15:
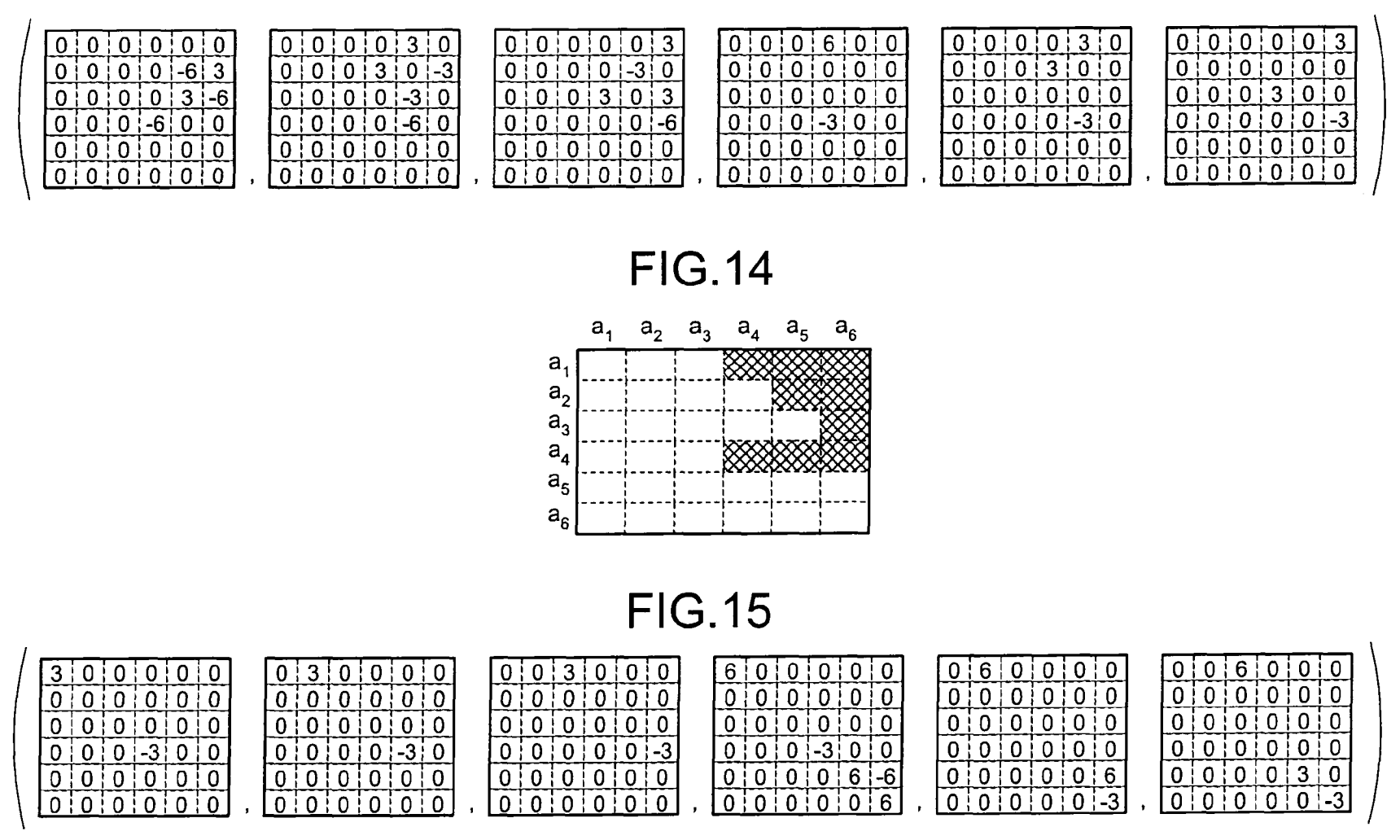

Next, the number of times multiplication is performed in the base field is further reduced through use of the second conditional expression using the second characteristic. For example, when the multiplication rule in the cubic extension field shown in FIG. 3 is assigned to the expression shown in FIG. 10, an expression expressed in the sixth degree extension field is obtained. Addition is performed in which 4*IV, 2(V−VI), 2*V, 2*IV, (V, VI), and V are respectively added to first to sixth terms. FIG. 13 is a diagram of an expression of addition results in this instance. In this case, in the multiplication performed in the base field calculated in the square in the algebraic torus T2(Fq^3), nine terms indicated by crosshatched portions in FIG. 14 are to be multiplied.

When the multiplication rule in the cubic extension field shown in FIG. 3 is assigned to the expression shown in FIG. 11, an expression expressed in the sixth degree extension field is obtained. Addition is performed in which 2*I, (II−III), II, 4*I, 2(II−III), and 2*II are respectively added to the first to sixth terms. FIG. 15 is a diagram of an expression of addition results in this instance. In this case, in the multiplication performed in the base field calculated in the square in the algebraic torus T2(Fq^3), nine terms indicated by crosshatched portions in FIG. 16 are to be multiplied.

When the multiplication rule in the cubic extension field shown in FIG. 3 is assigned to the expression shown in FIG. 12, an expression expressed in the sixth degree extension field is obtained. Addition is performed in which 4(I−IV), 2(II−V−III+VI), 2(II−V), 2(I−IV), (II−V−III+VI), and (II−V) are respectively added to the first to sixth terms. FIG. 17 is a diagram of an expression of addition results in this instance. In this case, in the multiplication performed in the base field calculated in the square in the algebraic torus T2(Fq^3), nine terms indicated by cross-hatched portions in FIG. 18 are to be multiplied.

Figures 16, 17, 18:
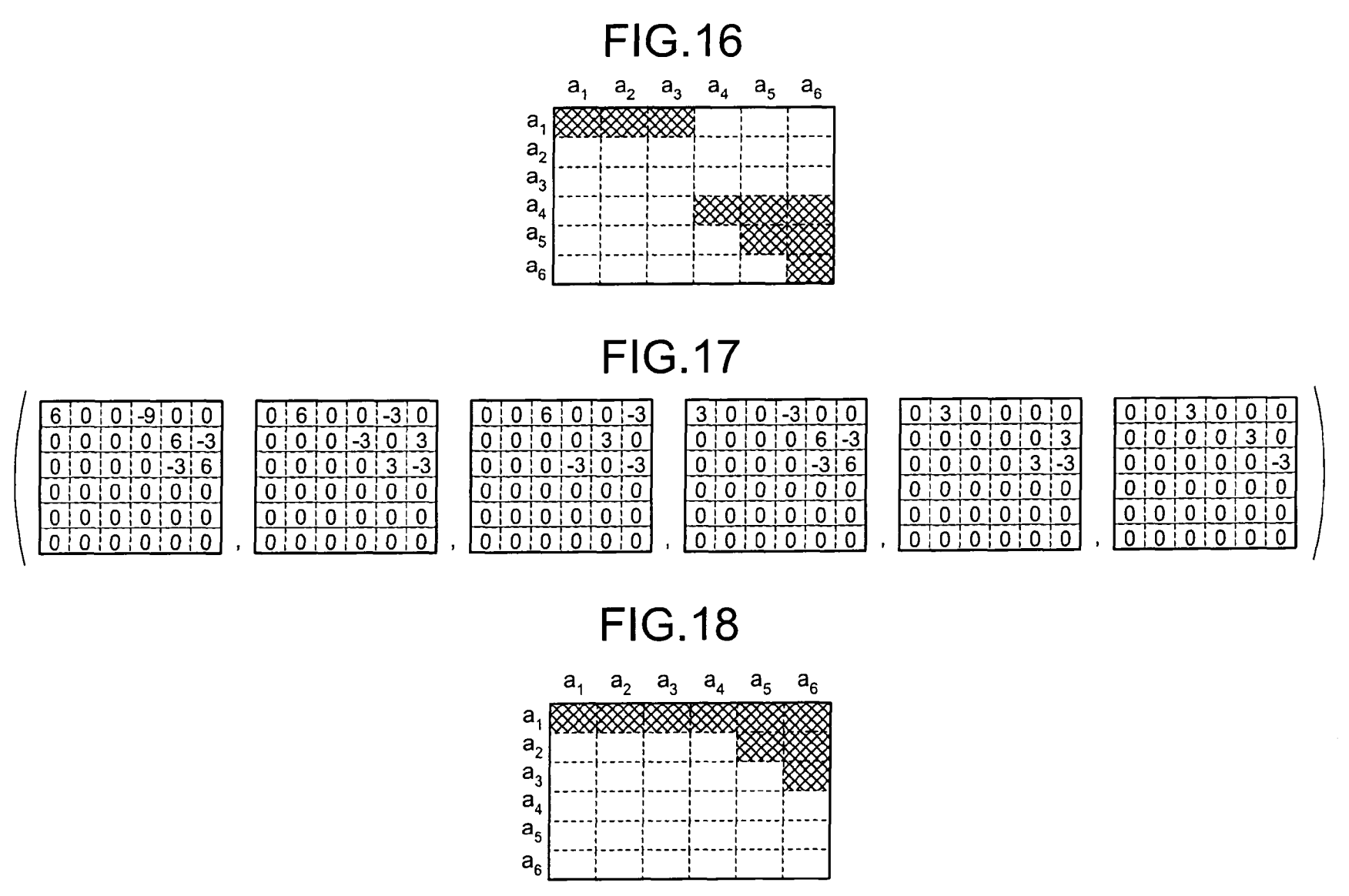

In any of the instances shown in FIG. 14, FIG. 16, and FIG. 18, it is clear that the multiplication is performed nine times when 'n=6'.

Next, a configuration of a computing device according to the first embodiment will be described. The computing device performs a square computation using a square computation method such as that described above. The computing device includes a controlling device, a storage device, an external storage device, and a communication interface (I/F). The controlling device, such as a central processing unit (CPU), controls an overall device. The storage device, such as a read-only memory (ROM) or a random access memory (RAM), stores various pieces of data and various programs. The external storage device, such as a hard disk drive (HDD) device or a compact disc (CD) drive device, stores various pieces of data and various programs. The communication I/F controls communication with an external device. The computing device also includes a bus that connects the controlling device, the storage device, the external storage device, and the communication I/F. An ordinary computer is used in a hardware configuration of the computing device.

Various functions realized in a hardware configuration, such as that described above, by the CPU in the computing device running the various programs stored in the storage device and the external storage device will be described in detail. FIG. 19 is a diagram of an example of a functional configuration of a computing device 100 according to the first embodiment. As shown in FIG. 19, the computing device 100 includes an accept unit 101, a multiplying unit 102, an adding and subtracting unit 103, an output unit 104, and a square computation rule creating unit (not shown). Each unit is generated in the storage device, such as the RAM, when the CPU runs a program.

A vector representing the elements of the sixth degree extension field is accepted into the accept unit 101. In other words, a vector including six elements included in two vectors that represent elements of the cubic extension field and include three elements is accepted. Specifically, elements of a finite body, such as 'A=(a1, a2, a3, a4, a5, a6)' that is a vector representation of six elements included in two vectors (a1, a2, a3) and (a4, a5, a6), are accepted into the accept unit 101. The square computation rule creating unit creates a square computation rule determined by the above-described modulus and base. In the square computation rule, the first conditional expression and the second conditional expression are applied to the Karatsuba algorithm. The multiplying unit 102 performs multiplication of, for example, the above-described nine terms shown in FIG. 14, in adherence to the square computation rule. The multiplication of the nine terms is, for example, 't1=a1*a4', 't2=a2*a5', 't3=a3*a6', 't4=(a1−a2)* (a4−a5)', 't5=(a1−a3)*(a4−a6)', 't6=(a2−a3)*(a5−a6)', 't7=a4*a4', 't8=a4*a5', and 't9=a4*a6' in the example in FIG. 14. The multiplying unit 102 can also perform multiplication of the nine terms shown in either of FIG. 16 and FIG. 18, instead of the nine terms shown in FIG. 14. In other words, in adherence to the square computation rule, the multiplying unit 102 performs at least one of a multiplication used in the Karatsuba algorithm on the elements of one of two cubic extension fields, and a multiplication used in the Karatsuba algorithm between the elements of two cubic extension fields. The multiplying unit 102 then calculates respective products of a1 that is a first element of the vector representing the elements of the cubic extension field and the first element a1, the first element a1 and a second element a2, and the first element a1 and a third element a3. Alternatively, the multiplying unit 102 calculates respective products of a4 that is a first element of the vector and the first element a4, the first element a4 and a second element a5, and the first element a4 and a third element a6. The multiplying unit 102 thereby obtains a multiplication value. In adherence to the square computation rule, the adding and subtracting unit 103 performs addition and subtraction using multiplication results from the multiplying unit 102 and the vector element ai(1≦i≦6), thereby calculating each element included in the vector representing the calculation result of the square. In other words, regarding the vector accepted into the accept unit 101, the adding and subtracting section 103 adds and subtracts with respect to the vector accepted to the accept unit 101, a second-order component of the vector, in which the multiplication value is multiplied by a coefficient that is an integer, or a constant in which a component of the vector is multiplied by a coefficient that is an integer or 1, or a first-order component of the vector, as required. The output unit 104 outputs a result of the calculation performed by the adding and subtracting unit 103 as a square computation result.

Figure 20:
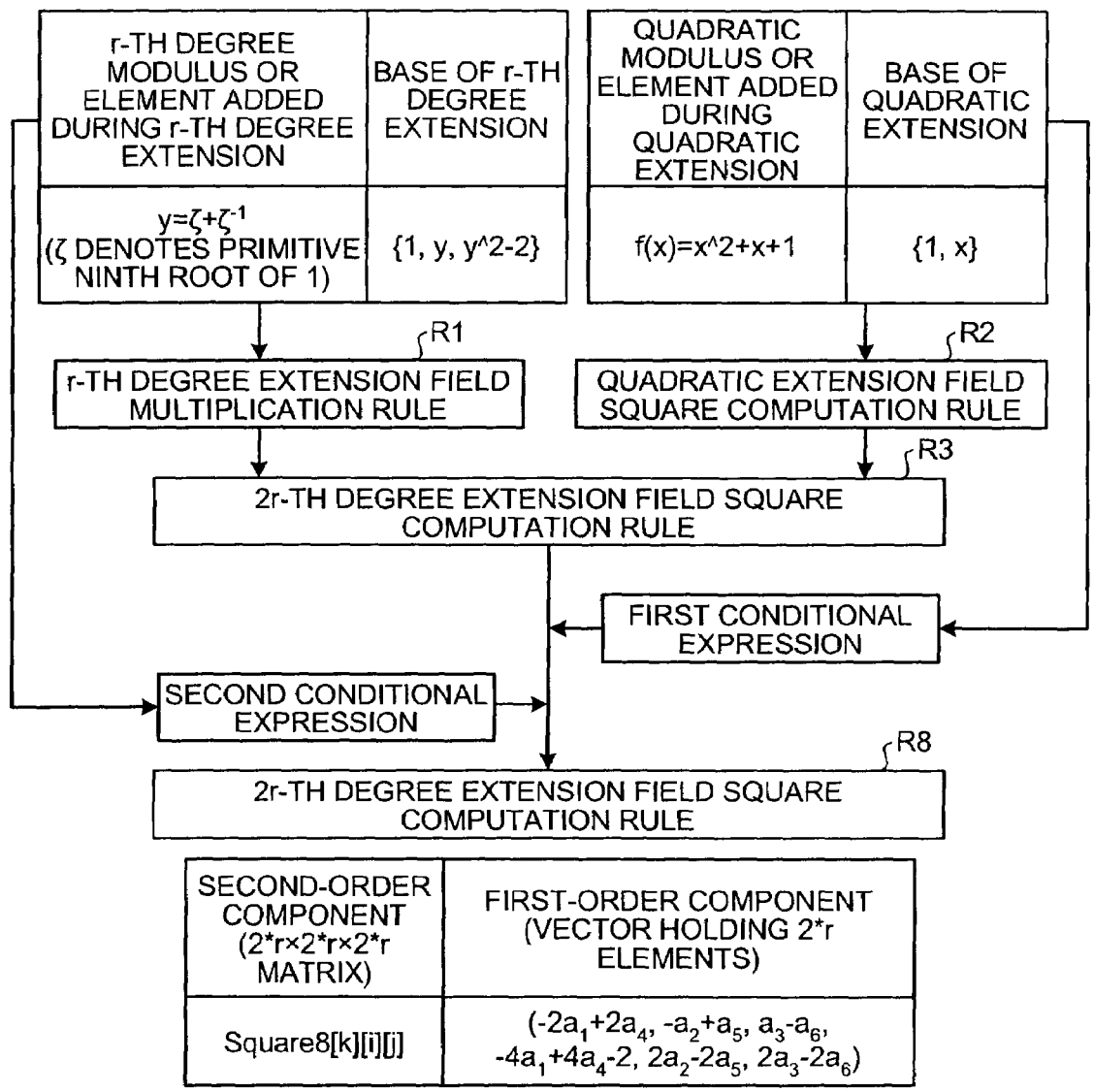
FIG. 20 is a diagram of an overview of a process by which the computing device 100 creates a square computation rule.

Next, a process performed by the computing device 100 according to the embodiment will be described. First, a process for creating the square computation rule to which the multiplying unit 102 and the adding and subtracting unit 103 adhere will be described. The square computation rule can be created every time the computing device 100 performs the square computation, described hereafter. Alternatively, the square computation rule can be prepared by being created in advance before the square computation is performed. FIG. 20 is a diagram of an overview of a process by which the computing device 100 creates the square computation rule. First, an r-th degree modulus or an element to be added when an r-th degree extension field is generated is accepted to the computing device 100. A base of the r-th degree extension field is also accepted to the computing device 100. In an example in which 'r=3', the modulus expressed by the above-described Expression 2 is accepted as the element to be added when the cubic extension field is generated. Further, {1, y, y^2−2} is accepted as the base. Upon accepting these, the computing device 100 generates the multiplication rule for a corresponding r-th degree extension field. Specifically, the computing device 100 generates the multiplication rule as follows. Vectors 'A=(a1, a2, a3)' and 'B=(b1, b2, b3)' representing two different elements of the cubic extension field are expressed by polynomial expressions, namely 'A=a1+a2*y+a3*(y^2−2)' and 'B=b1+b2*y+b3*(y^2−2)'. The computing device 100 generates a multiplication rule R1 'A*B=(a1*b1+2a2*b2+2a3*b3−a2*b3−a3*b3, a1*b2+a2*b1+a2*b3+a3*b2−a3*b3, a1*b3+a3*b1+a2*b2−a3*b3)'. The multiplication rule R1 is a vector representation of a polynomial obtained through multiplication of the two elements with each other as polynomials and calculation of a remainder by the modulus. The computing device 100 then stores the multiplication rule R1. For example, the computing device 100 stores the multiplication rule R1 as an element of an r×r×r matrix. Specifically, the computing device 100 stores a coefficient of ai*bj in a matrix Mult1[k][i][j] as a content of a k-th term of the vector representation. This is visualized in FIG. 3.

In a similar manner, a quadratic modulus or an element to be added when a quadratic extension is generated is accepted to the computing device 100. A base of the quadratic extension is also accepted to the computing device 100. In the above-described example, 'f(x)=x^2+x+1' is accepted as the quadratic modulus. Further, {1, x} is added as the base of the quadratic extension. Upon accepting these, the computing device 100 generates a square computation rule for a corresponding quadratic extension field. Specifically, the computing device 100 generates a square computation rule R2 'A^2=(a1^2−a2^2, 2a1*a2−a2^2)' that is a vector representation of a polynomial obtained by a vector 'A=(a1, a2)' representing the element of the quadratic extension field being expressed as a polynomial and multiplied as a polynomial, and a remainder being calculated by the modulus. The computing device 100 then stores the square computation rule R2. For example, the computing device 100 stores the square computation rule R2 as an element of a 2×2×2 matrix. Specifically, the computing device 100 stores a coefficient of ai*bj in a matrix Square2[k][i][j] as a content of the k-th term of the vector expression. This is visualized in FIG. 4.

Next, the computing device 100 generates a square computation rule R3 for a corresponding 2r-th degree extension field from the multiplication rule R1 of the r-th degree extension field and the square computation rule R2 of the quadratic extension. The computing device 100 then stores the square computation rule R3. For example, the computing device 100 stores the square computation rule R3 as an element of a 2*r×2*r×2*r matrix. Specifically, the computing device 100 generates a matrix Square3[k][i][j] corresponding to the square computation rule R3 as follows.

Regarding 'k=1, 2, 3, i=1, 2, 3', j=1, 2, 3', 'Square3[k][i][j]=Square1[1][1][1]*Mult1[k][i][j]'

Regarding 'k=1, 2, 3, i=4, 5, 6, j=1, 2, 3', 'Square3[k][i][j]=Square1[1][2][1]*Mult1[k][i−3][j]'

Regarding 'k=1, 2, 3, i=1, 2, 3, j=4, 5, 6', 'Square3[k][i][j]=Square1[1][1][2]*Mult1[k][i][j−3]'

Regarding 'k=1, 2, 3, i=4, 5, 6, j=4, 5, 6', 'Square3[k][i][j]=Square1[1][2][2]*Mult1[k][i−3][j−3]'

Regarding 'k=4, 5, 6, i=1, 2, 3, j=1, 2, 3', 'Square3[k][i][j]=Square1[2][1][1]*Mult1[k−3][i][j]'

Regarding 'k=4, 5, 6, i=4, 5, 6, j=1, 2, 3', 'Square3[k][i][j]=Square1[2][2][1]*Mult1[k−3][i−3][j]'

Regarding 'k=4, 5, 6, i=1, 2, 3, j=4, 5, 6', 'Square3[k][i][j]=Square1[2][1][2]*Mult1[k−3][i][j−3]'

Regarding 'k=4, 5, 6, i=4, 5, 6, j=4, 5, 6', 'Square3[k][i][j]=Square1[2][2][2]*Mult1[k−3][i−3][j−3]'

When the computation method above is summarized, 'Square3[k][i][j]=Square1[ceil(k/3)][ceil(i/3)][ceil(j/3)]*Mult1[k%3][i%3][j%3]'. Here, ceil(k) denotes a ceiling function (which returns a least number among integers greater than k). Further, k%r denotes a remainder obtained when k is divided by r. This is visualized in FIG. 5. This square computation rule R3 corresponds to the Karatsuba algorithm. Here, Expression 9 shown in FIG. 36A in which the right-hand side of the first conditional expression shown in Expression 3 is transposed is applied as the first conditional expression.

A specific equation of the first conditional expression is generated from the quadratic modulus or the element to be added when the quadratic extension is generated, and the base of the quadratic extension. A second-order component of the first conditional expression is expressed by a term 10 shown in FIG. 36A. FIG. 6 is a diagram of a matrix expressing the term 10. A vector representation of a first-order component '−1' of the first conditional expression is (−1, 0).

The computing device 100 stores the term 10. Then, the computing device 100 applies the first conditional expression to the square computation rule R3. In other words, the computing device 100 performs constant multiplication on the first term or the second term of the first conditional expression shown in FIG. 6 and adds the result to the first term or the second term of the square computation rule R3 shown in FIG. 5. At this time, when the number of elements in the matrix that are not '0' decreases, a new, efficient square computation rule has been obtained. Specifically, when at least one of a certain (i, j) is not '0' in relation to 'k=1, 2', the computing device 100 calculates 'tij' including a single multiplication operation. When the number of multiplication operations such as this decreases, a new, efficient square computation rule has been obtained. When retrieval is performed, for example, following three square computation rules are generated. The square computation rules are not shown in FIG. 20. One square computation rule is a square computation rule R4 in which the first term of the first conditional expression shown in FIG. 6 is subtracted from the first term of the square computation rule R3 shown in FIG. 5. The second-order component of the first conditional expression in the square computation rule R4 is that shown in FIG. 10. The first-order component is (1, 0). Another square computation rule is a square computation rule R5 in which the first term of the first conditional expression is doubled and added to the second term of the square computation rule R3. The second-order component in the square computation rule R5 is that shown in FIG. 11. The first-order component is (0, −2). Still another square computation rule is a square computation rule R6 in which the first term of the first conditional expression is added to each of the first term and the second term of the square computation rule R3. The second-order component in the square computation rule R6 is that shown in FIG. 12. The first-order component is (−1, −1). The square computation rules R4 to R6 reduce the number of times multiplication is performed, from 18 times to 12 times.

According to the first embodiment, more efficient square computation rules can be obtained through application of the second conditional expression to the square computation rules to which the first conditional expression is applied as described above. A specific equation of the second conditional expression is generated from the quadratic modulus or the element to be added when the quadratic extension is generated, the r-th degree modulus or the element to be added when the r-th degree extension is generated, and the base of the r-th degree extension. Here, Expression 11 shown in FIG. 36B in which the right-hand side of the second conditional expression shown in Expression 7 is transposed is applied as the second conditional expression.

A second-order component of the second conditional expression is expressed by a term 12 shown in FIG. 36B. A matrix expressing the term 12 is shown in FIG. 9. As described above, the first to sixth terms of the second-order component of the second conditional expression are (i, II, III, IV, V, VI).

A vector representation of a first-order component of the second conditional expression is expressed by Expression 13 shown in FIG. 36B.

When retrieval is performed, for example, following three square computation rules are generated. In FIG. 20, only a square computation rule R8 among the three generated square computation rules is shown. One square computation rule is a square computation rule R7 in which 4*IV, 2(V−VI), 2*V, 2*IV, (V−VI), and V are respectively added to the first to sixth terms of the square computation rule R4 shown in FIG. 10. The second-order component in the square computation rule R7 is that shown in FIG. 13. A vector representation of the first-order component is expressed by Expression 14 shown in FIG. 36B.

Another square computation rule is the square computation rule R8 in which 2*I, (II−III), II, 4*I, 2(II−III), and 2*II are respectively added to the first to sixth terms of the square computation rule R5 shown in FIG. 11. The second-order component in the square computation rule R8 is that shown in FIG. 15. A vector representation of the first-order component is expressed by Expression 15 shown in FIG. 36B in vector expression.

Still another square computation rule is a square computation rule R9 in which 4(I−IV), 2(II−V−III+VI), 2(II−V), 2(I−IV), (II−V−III+VI), and (II−V) are respectively added to the first to sixth terms of the square computation rule R6 shown in FIG. 12. The second-order component in the square computation rule R9 is that shown in FIG. 17. A vector representation of the first-order component is expressed by Expression 16 shown in FIG. 36B. As shown in FIG. 14, FIG. 16, and FIG. 18, the square computation rules R7 to R9 reduce the number of times multiplication is performed, from 12 times to 9 times.

Figure 21B:
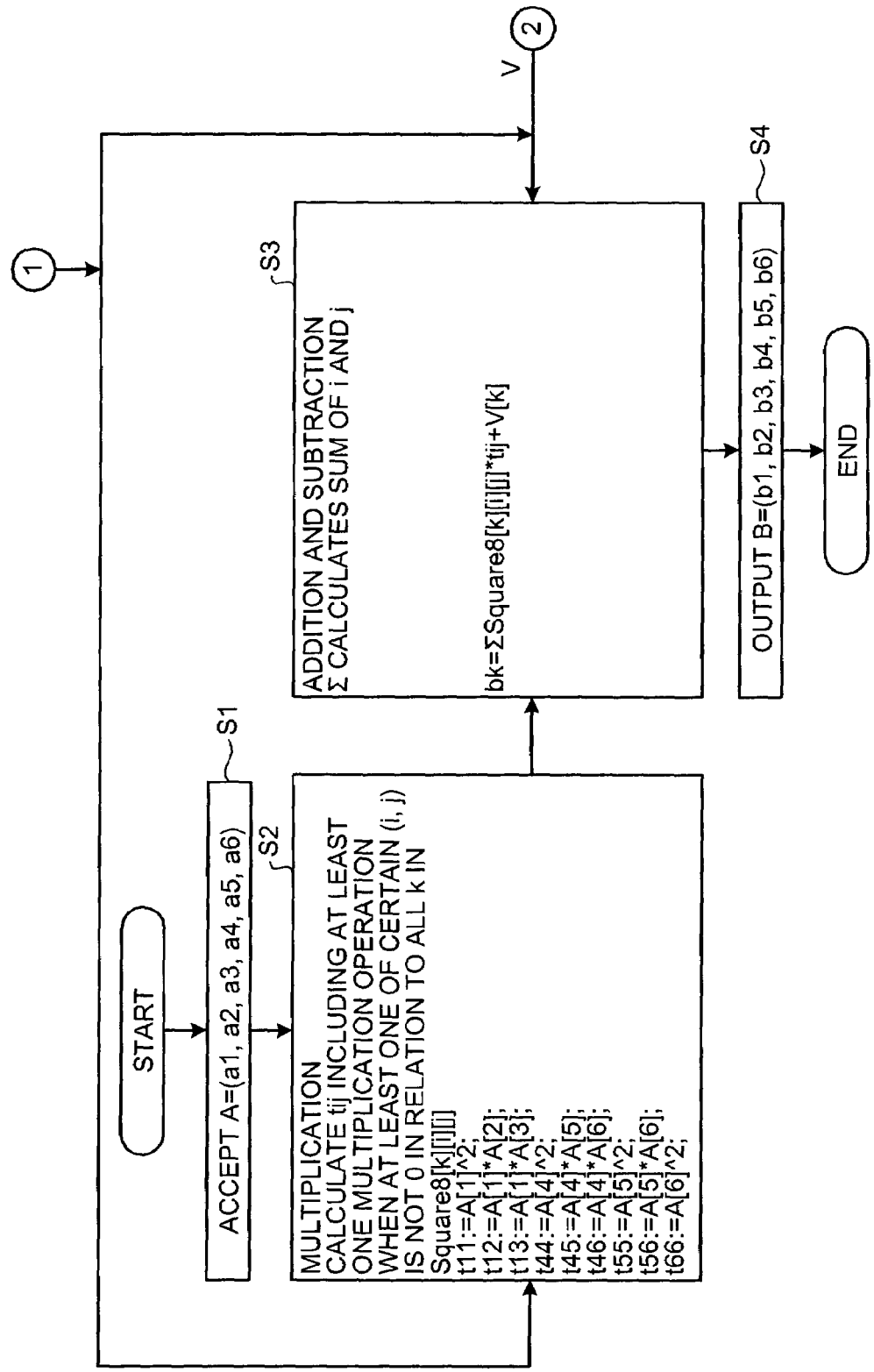

Next, a square computation process performed by the computing device 100 according to the first embodiment will be described with reference to FIGS. 21A and 21B. First, the quadratic modulus or the element to be added when the quadratic extension is generated, the base of the quadratic extension, the r-th degree modulus or the element to be added when the r-th degree extension is generated, and the base of the r-th degree extension are fixed. The computing device 100 reads the square computation rule corresponding to the fixed elements and the bases. The computing device 100 then performs the multiplication operations and the adding and subtracting operations based on the square computing rule. In the example in which 'r=3', the element to be added when the cubic extension field is generated is that shown in Expression 2. Further, $\{1, y, y^2-2\}$ is used as the base of the cubic extension. Further, '$f(x)=x^2+x+1$' is used as the quadratic modulus, and $\{1, x\}$ is fixed as the base of the quadratic extension. Here, the above-described square computation rule R8 is used. In the square computation rule R8, for example, the second-order component is held as a $2*r \times 2*r \times 2*r$ matrix Square8[k][i][j] (see FIG. 15). The first-order component is held as a vector (V) expressed by Expression 15. A vector including 2r elements is accepted to the computing device 100. At Step S1, for example, 'A=(a1, a2, a3, a4, a5, a6)' is accepted to the computing device 100.

Next, at Step S2, the computing device 100 performs multiplication operations with reference to the square computing rule R8. In the multiplication operations, regarding an element that is not '0' in the Square8[k][i][j], for example, 'tij=ai*aj' is calculated when 'i=1, 2, 3 and j=1, 2, 3'. When 'i=4, 5, 6 and j=4, 5, 6', 'tij=ai*aj' is calculated. When '(i, j)=(1, 4)', 't14=a1*a4' is calculated. When '(i, j)=(2, 5)', 't25=a2*a5' is calculated. When '(i,j)=(3, 6)', 't36=a3*a6' is calculated. Here, '(i, j)=(1, 5),(2, 4)' appears as a pair. Therefore, 't15=(a1−a2)*(a5−a4)' is calculated. Further, (i, j)=(1, 6),(3, 4) appears as a pair. Therefore, 't16=(a1−a3)*(a6−a4)' is calculated. Further, (i, j)=(2, 6),(3, 5) appears as a pair. Therefore, 't26=(a2−a3)*(a6−a5)' is calculated. Here, multiplication of the above-described nine terms in FIG. 16 is performed. The multiplication of each term is shown below. Here, A[i] is ai(i=1, 2, 3, 4, 5, 6).

t11:=A[1]^2;
t12:=A[1]*A[2];
t13:=A[1]*A[3];
t44:=A[4]^2;
t45:=A[4]*A[5];
t46:=A[4]*A[6];
t55:=A[5]^2;
t56:=A[5]*A[6];
t66:=A[6]^2;

At Step S3, the computing device 100 performs the addition and subtraction operations with reference to the square computation rule R8. For example, the computing device 100 calculates 'bk=ΣSquare8[k][i][j]*tij+V[k]'. Here, Σ calculates a sum of i and j. However, in each pair of '(i, j)=(1, 5),(2, 4)', '(i, j)=(1, 6),(3, 4)', and '(i, j)=(2, 6),(3, 5)' that does not appear in the square computation rule R8, but appears in the square computation rules R7 and R9, 't15+t14+t25', 't16+t14+t36', and 't26+t25+t36' are assigned to the pairs. Here, the computing device 100 performs the following addition and subtraction operations, and determines vector (b1, b2, b3, b4, b5, b6) expressing the computation result of the square.

b1:=3*t11−3*t44−2*A[1]+2*A[4]:
b2:=3*t12−3*t45−2*A[2]+A[5]:
b3:=3*t13−3*t46+A[3]−A[6]:
b4:=6*t11−3*t44+6*t55−6*t56+6*t66−4*A[1]+4*A[4]−2:
b5:=6*t12+6*t56−3*t66+2*A[2]−2*A[5]:
b6:=6*t13+3*t55−3*t66+2*A[3]−2*A[6]:

Subsequently, at Step S4, the computing device 100 outputs the '(b1, b2, b3, b4, b5, b6)=B' obtained at Step S3.

When the square computation rule R7, rather than the square computation rule R8, is applied at Step S2, the computing device 100 performs multiplication of the above-described nine terms shown in FIG. 14.

t44:=A[4]^2;
t45:=A[4]*A[5];
t46:=A[4]*A[6];

$t14 := A[1]*A[4]$;
$t15 := (A[1]-A[2])*(A[5]-A[4])$;
$t16 := (A[1]-A[3])*(A[6]-A[4])$;
$t25 := A[2]*A[5]$;
$t26 := (A[2]-A[3])*(A[6]-A[5])$;
$t36 := A[3]*A[6]$;

When the square computation rule R9, rather than the square computation rule R8, is applied at Step S3, the computing device 100 performs, for example, the addition and subtraction operations below.

$b1 := 9*t14 - 6*t25 - 6*t36 + 3*(t26+t25+t36) - 6*t44 + 4*A[4] + 1$:
$b2 := 3*(t15+t14+t25) - 3*(t26+t25+t36) + 3*t36 - 6*t45 - 2*A[5]$:
$b3 := -3*t25 + 3*(t16+t14+t36) + 3*t36 - 6*t46 - 2*A[6]$:
$b4 := 6*t14 - 3*t44 + 2*A[4]$:
$b5 := 3*(t15+t14+t25) - 3*t45 - A[5]$:
$b6 := 3*(t16+t14+t36) - 3*t46 - A[6]$:

When the square computation rule R9, rather than the square computation rule R8, is applied at Step S2, the computing device 100 performs multiplication of the above-described nine terms shown in FIG. 18.

$t11 := A[1]^2$;
$t12 := A[1]*A[2]$;
$t13 := A[1]*A[3]$;
$t14 := A[1]*A[4]$;
$t15 := (A[1]-A[2])*(A[5]-A[4])$;
$t16 := (A[1]-A[3])*(A[6]-A[4])$;
$t25 := A[2]*A[5]$;
$t26 := (A[2]-A[3])*(A[6]-A[5])$;
$t36 := A[3]*A[6]$;

When the square computation rule R9, rather than the square computation rule R8, is applied at Step S3, the computing device 100 performs, for example, the addition and subtraction operations below.

$b1 := 6*t11 - 9*t14 + 6*t25 + 6*t36 - 3*(t26+t25+t36) - 4*A[1] - 1$:
$b2 := 6*t12 - 3*(t15+t14+t25) + 3*(t26+t25+t36) - 3*t36 + 2*A[2]$:
$b3 := 6*t13 + 3*t25 - 3*(t16+t14+t36) - 3*t36 + 2*A[3]$:
$b4 := 3*t11 - 3*t14 + 6*t25 - 3*(t26+t25+t36) + 6*t36 - 2*A[1] - 1$:
$b5 := 3*t12 + 3*(t26+t25+t36) - 3*t36 + A[2]$:
$b6 := 3*t13 + 3*t25 - 3*t36 + A[3]$:

In a configuration such as that above, the speed of calculation of the exponent ($q^1+q^1$) can be increased in an algebraic torus that is a subgroup of an n-th degree extension field, in other words, a quadratic extension of an r-th degree extension field. Therefore, in torus compression public key cryptography, when the square computation is performed on an algebraic torus over a sixth degree extension field, the base (quadratic extension polynomial base and cubic extension polynomial base) ordinarily used for compression and decompression is not required to be converted to a pseudo-polynomial base, and the square computation can be performed at a high speed (see, for example, FIG. 22). Therefore, calculation time required for torus compression public key cryptography and pairing computation can be shortened. The calculation time is similarly shortened for square computation on an algebraic torus in pairing.

Next, a computing device, a method, and a computer program product according to a second embodiment will be described. Sections that are the same as those according to the above-described first embodiment are described using the same reference numbers. Explanations thereof may be omitted.

According to the above-described first embodiment, in the example in which 'r=3', the element to be added when the cubic extension field is generated is that shown in the above-described Expression 2. Further, $\{1, y, y^2-2\}$ is used as the base of the cubic extension. Still further, '$f(x)=x^2+x+1$' is used as the quadratic modulus, and $\{1, x\}$ is fixed as the base of the quadratic extension. According to the second embodiment, '$f3(y)=y^3-w$' is used as the cubic modulus, and $\{1, y, y^2\}$ is used as the base of the cubic extension. Further, '$f2(x)=x^2-\delta$' is used as the quadratic modulus, and $\{1, x\}$ is fixed as the base of the quadratic extension. In adherence to the square computation rule, the multiplying unit 102 performs a multiplication used in the Karatsuba algorithm on the elements of one of two cubic extension fields, and a multiplication between coefficients of the same term in the elements of two cubic extension fields. The multiplying unit 102 thereby obtains a multiplication value. The adding and subtracting unit 103 adds and subtracts with respect to the vector accepted to the accept unit 101, a second-order component of the vector, in which the multiplication value obtained by the multiplying unit 102 is multiplied by a coefficient calculated from an integer, w, or δ, or, a constant in which a component of the vector is multiplied by a coefficient calculated from an integer, w, or δ, or a first-order component of the vector, as required.

First, a process by which the computing device 100 according to the second embodiment creates a square computation rule will be described. When the cubic modulus and the base are accepted, the computing device 100 generates a multiplication rule of a corresponding r-th degree extension field. Specifically, the computing device 100 generates '$A*B = (a1*b1+w*(a2*b3+a3*b2), a1*b2+a2*b1+w*a3*b3, a1*b3+a3*b1+a2*b2)$' when vectors expressing two different elements of the cubic extension field are 'vector A=(a1, a2, a3)' and 'vector B=(b1, b2, b3)'. The computing device 100 then stores '$A*B=(a1*b1+w*(a2*b3+a3*b2), a1*b2+a2*b1+w*a3*b3, a1*b3+a3*b1+a2*b2)$' that is a multiplication rule R10. For example, the computing device 100 stores the square computation rule R10 to an element of an r×r×r matrix. This is visualized in FIG. 23.

In a similar manner, when the quadratic modulus and the base are accepted, the computing device 100 generates a square computation rule for a corresponding quadratic extension field. Specifically, the computing device 100 generates '$A^2=(a1^2+\delta*a2^2, 2a1*a2)$' when the vector representing an element of the quadratic extension field is 'vector A=(a1, a2)'. The computing device 100 then stores '$A^2=(a1^2+\delta*a2^2, 2a1*a2)$' that is a square computation rule R11. For example, the computing device 100 stores the square computation rule R11 to an element of a 2×2×2 matrix. This is visualized in FIG. 24.

Next, the computing device 100 generates a square computation rule R12 for a corresponding 2r-th degree extension field from the multiplication rule R10 of the r-th degree extension field and the square computation rule R11 of the quadratic extension. The computing device 100 then stores the square computation rule R12. For example, the computing device 100 stores the square computation rule R12 to an element of a 2*r×2*r×2*r matrix. This is visualized in FIG. 25.

In a manner similar to that according to the first embodiment, the square computation rule R12 is applied as the first conditional expression shown in Expression 9. A specific equation of the first conditional expression is generated from the quadratic modulus or the element to be added when the quadratic extension is generated, and the base of the quadratic extension. The second-order component of the first conditional expression is expressed by a term 10, below. A matrix expressing the term 10 is shown in FIG. 26. A vector representation of a first-order component '−1' of the first conditional expression is (−1, 0). The computing device 100 stores the first conditional expression. The computing device 100 then applies the first conditional expression to the square computation rule R11. When retrieval is performed, for example, following two rules are generated. A first rule is a square computation rule R13 in which the first term of the first conditional expression shown in FIG. 26 is subtracted from the first term of the square computation rule R11 shown in FIG. 24. The second-order component of the first conditional expression in the square computation rule R13 is that shown in FIG. 27. The first-order component is (1, 0). Another rule is a square computation rule R14 in which the first term of the first conditional expression is added to the first term of the square computation rule R11. The second-order component of the first conditional expression in the square computation rule R11 is that shown in FIG. 28. The first-order component is (−1, 0). The square computation rules R13 and R14 reduce the number of times multiplication is performed, from 18 times to 12 times, as shown in FIG. 27 and FIG. 28.

According to the second embodiment, more efficient square computation rules can be obtained through application of the second conditional expression to the square computation rules to which the first conditional expression is applied as described above. A specific equation of the second conditional expression is generated from the quadratic modulus or the element to be added when the quadratic extension is generated, the r-th degree modulus or the element to be added when the r-th degree extension is generated, and the base of the r-th degree extension. Here, in a manner similar to that according to the first embodiment, Expression 11 in which the right-hand side of the second conditional expression shown in Expression 7 is transposed is applied as the second conditional expression. A vector representation of a first-order component of the second conditional expression is expressed by Expression 17 shown in FIG. 36B.

Figure 31:
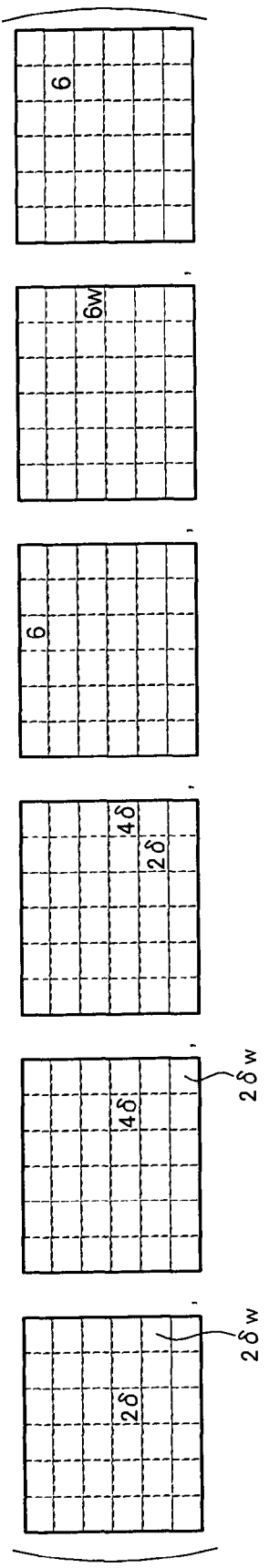
FIG. 31 is a diagram of an application example of the second conditional expression.
Figure 32:
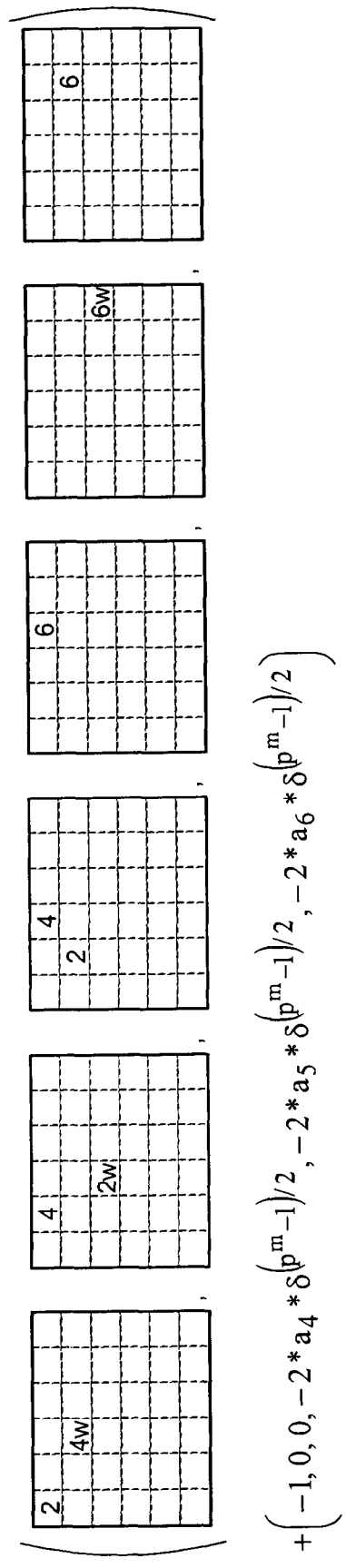
FIG. 32 is a diagram of an application example of the second conditional expression.
Figure 33:
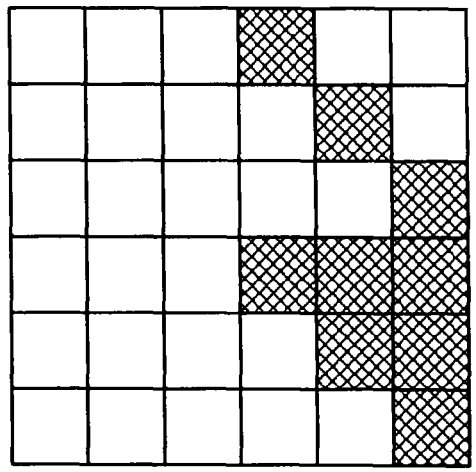
FIG. 33 is a diagram of a multiplication operation in the base field calculated on a square in an algebraic torus T6(Fq)
Figure 34:
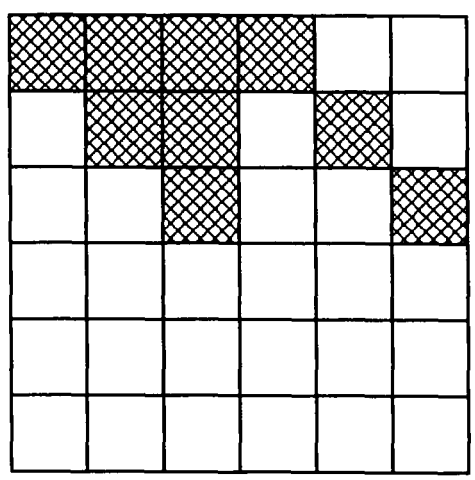
FIG. 34 is a diagram of a multiplication operation in the base field calculated on a square in an algebraic torus T6(Fq)

Here, when Expression 18 shown in FIG. 36B is obtained, first to third terms of the second conditional expression are expressed as shown in FIG. 29. Fourth to sixth terms of the second conditional expression are expressed as shown in FIG. 30. When retrieval is performed, for example, following two rules are generated. One rule is a square computation rule R15 in which the fourth term of the second conditional expression is doubled and added to the fourth term of the square computation rule R13, the fifth term of the second conditional expression is doubled and added to the fifth term of the square computation rule R13, and the sixth term of the second conditional expression is doubled and subtracted from the sixth term of the square computation rule R13. The square computation rule R15 is expressed in FIG. 31. Another rule is a square computation rule R16 in which, in a manner similar to that of the square computation rule R13, the fourth term of the second conditional expression is doubled and added to the fourth term of the square computation rule R14, the fifth term of the second conditional expression is doubled and added to the fifth term of the square computation rule R14, and the sixth term of the second conditional expression is doubled and subtracted from the sixth term of the square computation rule R14. The square computation rule R16 is expressed in FIG. 32. When multiplication is performed using the square computation rule R15 in FIG. 31, nine terms indicated by cross-hatched portions in FIG. 33 are to be multiplied. When multiplication is performed using the square computation rule R16 in FIG. 32, nine terms indicated by cross-hatched portions in FIG. 34 are to be multiplied. In other words, the square computation rules R15 and R16 reduce the number of times multiplication is performed, from 12 times to 9 times.

Next, a square computation process performed by the computing device 100 according to the second embodiment will be described with reference to FIGS. 35A and 35B. In an example in which 'r=3', 'f3($y$)=y^3−w' is used as the r-th modulus, and {1, y, y^2} is used as the base. Further, 'f2($x$)=x^2−δ' is used as the quadratic modulus, and {1, x} is fixed as the base. The above-described square computation rule R15 is used as a square computation rule corresponding to thereto. In the square computation rule R15, for example, the second-order component is held as a 2*r×2*r×2*r matrix Square15[k][i][j] (see FIG. 31). The first-order component is held as a vector (V) expressed by Expression 19 shown in FIG. 36B. The computing device 100 reads the square computation rule R13. Then, at Step S1, for example, 'A=(a1, a2, a3, a4, a5, a6)' is accepted to the computing device 100.

Next, at Step S12, the computing device 100 performs multiplication operations with reference to the square computing rule R15. The computing device 100 performs following multiplications, for example, regarding an element that is not '0' in the Square15[k][i][j].

t44:=A[4]^2;
t45:=A[4]*A[5];
t46:=A[4]*A[6];
t55:=A[5]^2;
t56:=A[5]*A[6];
t66:=A[6]^2;
t14:=A[1]*A[4];
t25:=A[2]*A[5];
t36:=A[3]*A[6];

At Step S13, the computing device 100 performs addition and subtraction operations with reference to the square computation rule R15. For example, the computing device 100 calculates 'bk=ΣSquare15[k][i][j]*tij+V[k]'. Here, Σ calculates a sum of i and j. Here, the computing device 100 performs following addition and subtraction operations and obtains the vector (b1, b2, b3, b4, b5, b6) representing a result of the square computation. Here, 'd:=delta^((p^m−1)/2);'. Regarding Square15[k][i][j]*tij, the vector may not be obtained by only the addition and subtraction operations, depending on the elements of the matrix. For example, a multiplication operation w*tij is performed when an element of the matrix is w, and w is not a natural number.

b1:=2*delta*t44+4*delta*w*t56+1;
b2:=4*delta*t45+2*delta*w*t66;
b3:=2*delta*t55+4*delta*t46;
b4:=6*t14−2*A[4]*d;
b5:=6*w*t36−2*A[5]*d;
b6:=6*t25−2*A[6]*d;

Subsequently, at Step S4, the computing device 100 outputs '(b1, b2, b3, b4, b5, b6)=B' obtained at Step S13.

When the square computation rule R16, rather than the square computation rule R15, is applied at Step S12, the computing device 100 performs, for example, following multiplications.

t11:=A[1]^2;
t12:=A[1]*A[2];
t13:=A[1]*A[3];
t22:=A[2]^2;
t23:=A[2]*A[3];
t33:=A[3]^2;
t14:=A[1]*A[4];
t25:=A[2]*A[5];
t36:=A[3]*A[6];

When the square computation rule R16, rather than the square computation rule R15, is applied at Step S13, the computing device 100 performs, for example, following addition and subtraction operations.
b1:=2*t11+4*w*t23−1;
b2:=4*t12+2*w*t33;
b3:=2*t22+4*t13;
b4:=6*t14−2*A[4]*d;
b5:=6*w*t36−2*A[5]*d;
b6:=6*t25−2*A[6]*d;

Even when the cubic modulus and the base, and the quadratic modulus and the base are used, in torus compression public key cryptography, when the square computation is performed on an algebraic torus over a sixth degree extension field, the base (quadratic extension polynomial base and cubic extension polynomial base) ordinarily used for compression and decompression is not required to be converted to a pseudo-polynomial base, and the square computation can be performed at a high speed. Therefore, calculation time required for torus compression public key cryptography and pairing computation can be shortened. The calculation time is similarly shortened for square computation on an algebraic torus in pairing.

The present invention is not limited to the above-described embodiments. Constituent elements can be modified and specified in practice without departing from the scope of the present invention. Various inventions can be achieved through appropriate combinations of a plurality of constituent elements disclosed according to the embodiments. For example, some constituent elements can be eliminated from the overall constituent elements indicated according to the embodiments. Moreover, combinations of constituent elements according to different embodiments can be used accordingly. Various modifications such as the following examples can be made.

According to each of the above-described embodiments, various programs run in the computing device 100 can be stored on a computer connected to the computing device 100 over a network, such as the Internet. The stored programs can be provided by being downloaded over the network. Alternatively, the various programs can be provided stored on a computer-readable recording medium, such as a compact disc read-only memory (CD-ROM), a flexible disk (FD), a compact disc-recordable (CD-R), and a digital versatile disk (DVD), in an installable format file or an executable format file. In this case, the computing device 100 reads a program from the recording medium and runs the program, thereby loading the program onto a main storage device (such as the RAM) Various sections of the above-described functional configuration are generated in the main storage device.

According to each of the above-described embodiments, the computing device 100 includes a square computation rule creating unit. The computing device 100 generates the square computation rules. However, instead of the computing device 100 including the square computation rule creating unit, another information processing device can generate the square computation rules. The computing device 100 can acquire the square computation rules from the other information processing device and use the acquired square computation rules when performing the square computation.

According to the first embodiment, the process at Step S2 and the process at Step S3 can be performed in parallel. The addition and subtraction operations at Step S2 can be performed as required, in an order by which the multiplication value that is used at Step S3 and is the result of the multiplication operation at Step S2 is determined. The same applies to the process at Step S12 and the process at Step S13 according to the second embodiment.

According to each of the above-described embodiments, when the computing device 100 performs a square computation on a sixth degree extension field serving as a finite field is described. However, the finite field is not limited to the sixth degree extension field. Configurations according to each of the above-described embodiments can be applied. An instance is described below where the computing device 100 performs the square computation, namely an exponentiation of a square. However, configurations according to each of the above-described embodiments can also be applied when the computing device 100 performs an exponentiation of the exponent (q^1+q^1') over a 2r-th degree extension field (q is a characteristic of an extension field).

Regarding the square in the Karatsuba algorithm, according to each of the above-described embodiments, for example, 'A^2=(a1^2−a2^2, 2a1*a2−a2^2)' is calculated in the quadratic extension field. At this time, the multiplication operations performed can be as follows.
t11:=a1^2;
t12:=a1*a2;
t22:=a2^2;

However, calculation can also be performed as follows, using only the square.
t11:=a1^2;
t12':=(a1+a2)^2;
t22:=a2^2;

Calculations such as this can be applied to the square in the Karatsuba algorithm related to the elements of one of two cubic extension fields in the square computation rules R16, R15, and R8.

For example, when the calculation is applied to when the square computation rule R16 is applied, the computing device 100 performs, for example, the following multiplications.
t11:=A[1]^2;
t12':=(A[1]+A[2])^2;
t13':=(A[1]+A[3])^2;
t22:=A[2]^2;
t23':=(A[2]+A[3])^2;
t33:=A[3]^2;
t14:=A[1]*A[4];
t25:=A[2]*A[5];
t36:=A[3]*A[6];

The computing device 100 performs, for example, the following addition and subtraction operations.
b1:=2*t11+2*w*(t23'−t22−t33)−1;
b2:=2*(t12'−t11−t22)+2*w*t33;
b3:=2*t22+2*(t13'−t11−t33);
b4:=6*t14−2*A[4]*d;
b5:=6*w*t36−2*A[5]*d;
b6:=6*t25−2*A[6]*d;

When the calculation is applied to when the square computation rule R15 is applied, the computing device 100 performs, for example, the following multiplications.
t44:=A[4]^2;
t45':=(A[4]+A[5])^2;
t46':=(A[4]+A[6])^2;
t55:=A[5]^2;
t56':=(A[5]+A[6])^2;
t66:=A[6]^2;
t14:=A[1]*A[4];
t25:=A[2]*A[5];
t36:=A[3]*A[6];

The computing device 100 performs the following addition and subtraction operations, and determines the vector (b1, b2, b3, b4, b5, b6).
b1:=2*delta*t44+2*delta*w*(t56'−t55−t66)+1;
b2:=2*delta*(t45'−t44−t55)+2*delta*w*t66;

b3:=2*delta*t55+2*delta*(t46'−t44−t66);
b4:=6*t14−2*A[4]*d;
b5:=6*w*t36−2*A[5]*d;
b6:=6*t25−2*A[6]*d;

When the calculation is applied to when the square computation rule R8 is applied, the computing device 100 performs, for example, the following multiplications.
t11:=A[1]^2;
t12:=A[1]*A[2];
t13:=A[1]*A[3];
t44:=A[4]^2;
t45':=(A[4]+A[5])^2;
t46':=(A[4]+A[6])^2;
t55:=A[5]^2;
t56':=(A[5]+A[6])^2;
t66:=A[6]^2;

The computing device 100 performs the following addition and subtraction operations, and determines the vector (b1, b2, b3, b4, b5, b6).
b1:=3*t11−3*t44−2*A[1]+2*A[4]:
b2:=3*t12−3*(t45'−t44−t55)/2−2*A[2]+A[5]:
b3:=3*t13−3*(t46'−t44−t66)/2+A[3]−A[6]:
b4:=6*t11−3*t44+9*t55−3*t56'+9*t66−4*A[1]+4*A[4]−2:
b5:=6*t12+3*t56'−3*t55−6*t66+2*A[2]−2*A[5]:
b6:=6*t13+3*t55−3*t66+2*A[3]−2*A[6]:

When the square computation rule R8 is applied and a portion is calculated using a square to prevent division, the computing device 100 performs, for example, the following multiplications.
t11:=A[1]^2;
t12:=A[1]*A[2];
t13:=A[1]*A[3];
t44:=A[4]^2;
t45:=A[4]*A[5];
t46:=A[4]*A[6];
t55:=A[5]^2;
t56':=(A[5]+A[6])^2;
t66:=A[6]^2;

The computing device 100 performs the following addition and subtraction operations, and determines the vector (b1, b2, b3, b4, b5, b6).
b1:=3*t11−3*t44−2*A[1]+2*A[4]:
b2:=3*t12−3*t45−2*A[2]+A[5]:
b3:=3*t13−3*t46+A[3]−A[6]:
b4:=6*t11−3*t44+9*t55−3*t56'+9*t66−4*A[1]+4*A[4]−2:
b5:=6*t12+3*t56'−3*t55−6*t66+2*A[2]−2*A[5]:
b6:=6*t13+3*t55−3*t66+2*A[3]−2*A[6]:

In the above-described configuration as well, the speed of calculation of the exponent ($q^1+q^1'$) can be increased in an algebraic torus that is a subgroup of an n-th degree extension field, namely a quadratic extension of an r-th degree extension field.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computing device that calculates a square of an element in a finite field, the finite field being a 2r-th degree extension field $Fq^{\{2r\}}$, where ^ denotes an exponent, and r denotes a prime number, the computing device comprising:

an accept unit configured to accept a plurality of elements in the finite field, the elements having a vector representation;

a creating unit configured to create first and second conditions under which the element in the finite field is placed in an algebraic torus, the first condition using a characteristic in which the element of the 2r-th degree extension field is an element of the algebraic torus T2r(Fq), and the second condition using a characteristic in which the element of the 2r-th degree extension field is an element of the algebraic torus T2(Fq^r);

a multiplying unit configured to perform multiplication operations on a base field Fq using accepted elements and to obtain a multiplication value, one of the multiplication operations being determined by the first condition, and another one of the multiplication operations being determined by the second condition;

an adding and subtracting unit configured to perform an addition and subtraction operation using the multiplication value and the accepted elements, and to obtain a calculation result of the square of the element, the addition and subtraction operation being determined by the first and second conditions; and an output unit configured to output the calculation result, wherein the creating unit is configured to create the first condition such that the element of the 2r-th degree extension field is '1' when raised to a power of Φ2r(q), where Φn(x) is a n-th cyclotomic polynomial, and to create the second condition such that an element of the 2r-th degree extension field is '1' when raised to a power of Φ2(q^r), where q denotes a characteristic of an extension field.

2. The device according to claim 1, wherein:

a modulus and a base of an r-th degree extension of the 2r-th degree extension field $Fq^{\{2r\}}$, and a modulus and a base of a quadratic extension are fixed in advance, the multiplying unit is configured to perform multiplication operations on the base field Fq using the accepted elements and to obtain multiplication values, one of the multiplication operations being determined by the fixed modulus and base, and the first condition, and another one of the multiplication operations being determined by the second condition, and the adding and subtracting unit is configured to perform addition and subtraction operations using the obtained multiplication values and the accepted elements, and to obtain the calculation result of the square, an addition and subtraction operation being determined by the fixed modulus and base, and the first condition, and an addition and subtraction operation being determined by the second condition.

3. The device according to claim 1, wherein:

a vector representation of an element of the 2r-th degree extension field is accepted by the accept unit, the vector representation including 2r elements, the multiplying unit is configured to perform a multiplication operation on the base field Fq using the accepted elements and to obtain a multiplication value, the multiplication operation being performed in adherence to a square computation rule determined by the first condition and the second condition being applied to the Karatsuba algorithm, and the adding and subtracting unit is configured to perform an addition and subtraction operation using the obtained multiplication value and the accepted elements, and to obtain the calculation result of the square, the addition and subtraction operation being performed in adherence to the square computation rule.

4. The device according to claim 1, wherein:
the multiplying unit is configured to obtain the multiplication value by, in adherence to a square computation rule expressed by at least one of a second-order component and a first-order component related to the accepted elements, calculating a product of at least a set of two relevant elements among the elements, or calculating a square of one element, based on whether the second-order component is '0', and
the adding and subtracting unit is configured to obtain the calculation result of the square by calculating each element included in a 2r-th vector using a coefficient of the second-order component, the obtained multiplication value, and the first-order component.

5. The device according to claim 1, wherein:
the 2r-th degree extension field is a field extended by a binomial modulus, and a base is a pseudo-polynomial base or a polynomial base, and
the multiplying unit is configured to perform a multiplication operation on a base field using the accepted elements and to obtain a multiplication value, the multiplication operation performed in adherence to a square computation rule determined by the modulus and the base, and by application of the first condition and the second condition to the Karatsuba algorithm.

6. The device according to claim 5, wherein:
a modulus of an r-th degree extension of the 2r-th degree extension field is fixed in advance to 'fr(y)=y^r−w', a base thereof is fixed in advance to $\{1, y, \ldots, y^{r-1}\}$, a modulus of the quadratic extension is fixed in advance to 'f2(x)=x^2−δ', and a base thereof is fixed in advance to $\{1, x\}$, and
the multiplying unit is configured to perform a multiplication operation on the base field Fq using the accepted elements and to obtain a multiplication value, the multiplication operation being performed in adherence to a square computation rule determined by the fixed moduli and bases, and by application of the first condition and the second condition to the Karatsuba algorithm.

7. The device according to claim 5, wherein:
a vector representing elements of the 2r-th extension field and including 2r elements included in two first vectors that include r elements is accepted by the accepting unit, a first vector representing elements of an r-th degree extension field,
the multiplying unit is configured to perform multiplication operations in adherence to the square computation rule and to obtain the multiplication values, one of the multiplication operations being used in the Karatsuba algorithm on the elements of one of two r-th degree extension fields, and another one of the multiplications operations multiplexing coefficients of a same term of elements in two r-th degree extension fields, and
the adding and subtracting unit is configured to add and subtract a second-order component, in which the multiplication value is multiplied by a coefficient calculated from an integer, w, or, δ, to and from 1, a constant in which a component of the first vector is multiplied by a coefficient calculated from an integer, w, or δ, or a first-order component, as required, and to obtain the calculation result of the square.

8. The device according to claim 5, wherein:
r=3,
a first square computation rule in which the first condition is applied to the Karatsuba algorithm includes six terms, a second conditional expression expressing the second condition includes six terms,
the square computation rule is that in which a fourth term of the second conditional example is doubled and added to a fourth term of the first square computation rule, a fifth term of the second conditional expression is doubled and added to a fifth term of the first square computation rule, and a sixth term of the second conditional expression is doubled and subtracted from a sixth term of the first square computation rule, and
the multiplying unit is configured to perform a multiplication operation on a subject term in adherence to the square computation rule and to obtain the multiplication value.

9. The device according to claim 8, wherein:
A[i] (i=1, 2, 3, 4, 5, 6) is each element included in the vector, and
the multiplying unit is configured to perform one of a multiplication operation and a square computation for determining A[1]^2, A[1]*A[2], A[1]*A[3], A[2]^2, A[2]*A[3], A[3]^2, A[1]*A[4], A[2]*A[5], and A[3]*A[6] in adherence to the square computation rule, and to obtain the multiplication value.

10. The device according to claim 8, wherein:
A[i] (i=1, 2, 3, 4, 5, 6) is each element included in the vector, and
the multiplying unit is configured to perform one of a multiplication operation and a square computation for determining A[4]^2, A[4]*A[5], A[4]*A[6], A[5]^2, A[5]*A[6], A[6]^2, A[1]*A[4], A[2]*A[5], and A[3]*A[6] in adherence to the square computation rule, and to obtain the multiplication value.

11. The device according to claim 1, wherein:
the 2r-th degree extension field is one of a cyclotomic field and a subfield of a cyclotomic field, and a base is a pseudo-polynomial base or a polynomial base, and
the multiplying unit is configured to perform a multiplication operation on a base field using the accepted elements and obtains a multiplication value, the multiplication operation performed in adherence to a square computation rule determined by the modulus and the base, and by application of the first condition and the second condition to the Karatsuba algorithm.

12. The device according to claim 11, wherein:
r=3,
a modulus of a cubic extension field of a sixth degree extension field is fixed in advance to 'y=ζ+ζ^(−1)' (ζ denotes a primitive ninth root of 1), a base thereof is fixed in advance to $\{1, y, y^2−2\}$, a modulus of the quadratic extension is fixed in advance to 'f(x)=x^2+x+1', and a base thereof is fixed in advance to $\{1, x\}$, and
the multiplying unit is configured to perform a multiplication operation on a base field using the accepted elements and to obtain a multiplication value, the multiplication operation being determined by the fixed moduli and bases, and by application of the first condition and the second condition to the Karatsuba algorithm.

13. The device according to claim 11, wherein:
a vector representing elements of a sixth degree extension field and including six elements included in two first vectors that include three elements is accepted by the accept unit, a first vector representing elements of a cubic extension field,
the multiplying unit is configured to perform, in adherence to the square computation rule, at least one of a multiplication operation used in the Karatsuba algorithm on the elements of one of two cubic extension fields, and a multiplication operation used in the Karatsuba algorithm between the elements of two cubic extension fields, to calculate respective products of a first element of the first vector and the first element, the first element and a second element, and the first element and a third element for the elements of one of the two cubic extension fields, and to obtain a multiplication value, and the adding and subtracting unit is configured to add and subtract a second-order component, in which the multiplication value is multiplied by a coefficient that is an integer, to and from 1, a constant in which a component of the first vector is multiplied by a coefficient that is an integer, or a first-order component, as required, and to obtain the calculation result of the square.

14. The device according to claim 11, wherein:

a first square computation rule in which the first condition is applied to the Karatsuba algorithm includes six terms, a second conditional expression expressing the second condition includes six terms, the square computation rule is that in which a fourth term of the second conditional expression is quadrupled and added to a first term of the first square computation rule, a value obtained by subtracting the fourth term of the second conditional expression from a third term of the second conditional expression is doubled and added to a second term of the first square computation rule, a fifth term of the second conditional expression is doubled and added to a third term of the first square computation rule, a sixth term of the second conditional expression is doubled and added to a fourth term of the first square computational expression, a value obtained when the sixth term of the second conditional expression is subtracted from the fifth term of the second conditional expression is added to a fifth term of the first square computation rule, and the sixth term of the second conditional expression is added to a sixth term of the first square computation rule, and the multiplying unit is configured to perform a multiplication operation on a subject term in adherence to the square computation rule and to obtain the multiplication value.

15. The device according to claim 14, wherein:

$A[i]$ (i=1, 2, 3, 4, 5, 6) is each element included in the vector, and the multiplying unit is configured to perform a multiplication operation or a square computation for determining $A[1]^2$, $A[1]*A[2]$, $A[1]*A[3]$, $A[4]^2$, $A[4]*A[5]$, $A[4]*A[6]$, $A[5]^2$, $A[5]*A[6]$, and $A[6]^2$ in adherence to the square computation rule, and to obtain the multiplication value.

16. The device according to claim 11, wherein:

a first square computation rule in which the first condition is applied to the Karatsuba algorithm includes six terms, a second conditional expression expressing the second condition includes six terms, the square computation rule is that in which a first term of the second conditional expression is doubled and added to a first term of the first square computation rule, a value obtained by subtracting the third term of the second conditional expression from a second term of the second conditional expression is added to a second term of the first square computation rule, the second term of the second conditional expression is added to a third term of the first square computation rule, a first term of the second conditional expression is quadrupled and added to a fourth term of the first square computational expression, a value obtained when the third term of the second conditional expression is subtracted from the second term of the second conditional expression is added to a fifth term of the first square computation rule, and the second term of the second conditional expression is doubled and added to a sixth term of the first square computation rule, and the multiplying unit is configured to perform a multiplication operation on a subject term in adherence to the square computation rule and to obtain the multiplication value.

17. The device according to claim 16, wherein:

$A[i]$ (i=1, 2, 3, 4, 5, 6) is each element included in the vector, and the multiplying unit is configured to perform a multiplication operation or a square computation for determining $A[4]^2$, $A[4]*A[5]$, $A[4]*A[6]$, $A[1]*A[4]$, $(A[1]-A[2])*(A[5]-A[4])$, $(A[1]-A[3])*(A[6]-A[4])$, $A[2]*A[5]$, $(A[2]-A[3])*(A[6]-A[5])$, and $A[3]*A[6]$ in adherence to the square computation rule, and to obtain the multiplication value.

18. The device according to claim 11, wherein:

a first square computation rule in which the first condition is applied to the Karatsuba algorithm includes six terms, a second conditional expression expressing the second condition includes six terms, the square computation rule is that in which a value obtained by a fourth term of the second conditional expression being subtracted from a first term of the second conditional expression is quadrupled and added to a first term of the first square computation rule, a value obtained by a sixth term of the conditional expression being added to a value obtained by the fourth term and a third term of the second conditional expression being subtracted from a second term of the second conditional expression is doubled and added to a second term of the first square computation rule, a value obtained by a fifth term of the second conditional expression being subtracted from the second term of the second conditional expression is doubled and added to a third term of the first square computation rule, a value obtained by the fourth term of the second conditional expression being subtracted from the first term of the conditional expression is doubled and added to a fourth term of the first square computation rule, a value obtained by the sixth term of the second conditional expression being added to a value obtained by the fifth term and the third term of the second conditional expression being subtracted from the second term of the second conditional expressed is added to a fifth term of the first square computational rule, and a value obtained by the fifth term of the second conditional expression being subtracted form the second term of the second conditional expression is added to a sixth term of the first square computational rule, and the multiplying unit is configured to perform a multiplication operation on a subject term in adherence to the square computation rule, and to obtain the multiplication value.

19. The device according to claim 18, wherein:

$A[i]$ (i=1, 2, 3, 4, 5, 6) is each element included in the vector, and the multiplying unit is configured to perform a multiplication operation or a square computation for determining $A[1]^2$, $A[1]*A[2]$, $A[1]*A[3]$, $A[1]*A[4]$, $(A[1]-A[2])*(A[5]-A[4])$, $(A[1]-A[3])*(A[6]-A[4])$, $A[2]*A[5]$, $(A[2]-A[3])*(A[6]-A[5])$, and $A[3]*A[6]$ in adherence to the square computation rule, and to obtain the multiplication value.

20. A computing device that calculates an exponent ($q\hat{\ }1+q\hat{\ }1'$) (where $\hat{\ }$ denotes an exponent, and q denotes an order of a base field Fq) of an element in a 2r-th degree extension field, the computing device comprising:
- an accept unit configured to accept 2r elements in the 2r-th degree extension field, the elements having a vector representation;
- a creating unit configured to create first and second conditions under which the element in the finite field is placed in an algebraic torus, the first condition using a characteristic in which the element of the 2r-th degree extension field is an element of the algebraic torus T2r(Fq), and the second condition using a characteristic in which the element of the 2r-th degree extension field is an element of the algebraic torus T2(Fq$\hat{\ }$r);
- a multiplying unit configured to perform multiplication operations on the base field Fq using the accepted elements and to obtain a multiplication value, one of the multiplication operations being performed in adherence to a calculation rule determined by the first condition, and another one of the multiplication operations being determined by the second condition;
- an adding and subtracting unit configured to perform an addition and subtraction operation using the multiplication value and the accepted elements, and to obtain a calculation result of the exponent ($q\hat{\ }1+q\hat{\ }1'$) of the element, the addition and subtraction operation being performed in adherence to the calculation rule; and
- an output unit that configured to output the calculation result wherein
- the creating unit is configured to create the first condition such that the element of the 2r-th degree extension field is '1' when raised to a power of $\Phi 2r(q)$, where $\Phi n(x)$ is a n-th cyclotomic polynomial, and to create the second condition such that an element of the 2r-th degree extension field is '1' when raised to a power of $\Phi 2(q\hat{\ }r)$.

21. A method of computing a square executed by a computing device that includes an accept unit, a creating unit, a multiplying unit, an adding and subtracting unit, and an output unit, and that calculates a square of an element in a finite field, the finite field being a 2r-th degree extension field $Fq\hat{\ }\{2r\}$, where $\hat{\ }$ denotes an exponent, and r denotes a prime number, the method comprising:
- accepting, by the accept unit, a plurality of elements in the finite field, the elements having a vector representation;
- creating, by the creating unit, first and second conditions under which the element in the finite field is placed in an algebraic torus, the first condition using a characteristic in which the element of the 2r-th degree extension field is an element of the algebraic torus T2r(Fq), and the second condition using a characteristic in which the element of the 2r-th degree extension field is an element of the algebraic torus T2(Fq$\hat{\ }$r);
- obtaining a multiplication value, by the multiplying unit, by performing multiplication operations on a base field using the accepted elements, one of the multiplication operations being determined by the first condition, and another one of the multiplication operations being determined by the second condition;
- obtaining a calculation result of the square of the elements by the adding and subtracting unit, by performing an addition and subtraction operation using the obtained multiplication value and the accepted elements, the addition and subtraction operation being determined by the first and second conditions; and
- outputting the calculation result by the output unit, wherein
- the creating includes creating the first condition such that the element of the 2r-th degree extension field is '1' when raised to a power of $\Phi 2r(q)$, where $\Phi n(x)$ is a n-th cyclotomic polynomial, and
- the creating includes creating the second condition such that an element of the 2r-th degree extension field is '1' when raised to a power of $\Phi 2(q\hat{\ }r)$, where q denotes a characteristic of an extension field.

22. A computer program product having a non-transitory computer-readable medium including programmed instructions, wherein when executed by a computer provided in a computing device that includes an accept unit, a creating unit, a multiplying unit, an adding and subtracting unit, and an output unit, and that calculates a square of an element in a finite field, the finite field being a 2r-th degree extension field $Fq\hat{\ }\{2r\}$, where $\hat{\ }$ denotes an exponent, and r denotes a prime number, the instructions cause the computer to perform:
- accepting a plurality of elements in the finite field, the elements having a vector representation;
- creating first and second conditions under which the element in the finite field is placed in an algebraic torus, the first condition using a characteristic in which the element of the 2r-th degree extension field is an element of the algebraic torus T2r(Fq), and the second condition using a characteristic in which the element of the 2r-th degree extension field is an element of the algebraic torus T2(Fq$\hat{\ }$r);
- obtaining a multiplication value by performing multiplication operations on a base field using the accepted elements, one of the multiplication operations being determined by the first condition, and another one of the multiplication operations being determined by the second condition;
- obtaining a calculation result of a square of the element by performing an addition and subtraction operation using the multiplication value and the accepted elements, the addition and subtraction operation being determined by the first and second conditions; and
- outputting the calculation result, wherein
- the creating includes creating the first condition such that the element of the 2r-th degree extension field is '1' when raised to a power of $\Phi 2r(q)$, where $\Phi n(x)$ is a n-th cyclotomic polynomial, and
- the creating includes creating the second condition such that an element of the 2r-th degree extension field is '1' when raised to a power of $\Phi 2(q\hat{\ }r)$, where q denotes a characteristic of an extension field.

* * * * *